(12) United States Patent
Yilmaz et al.

(10) Patent No.: US 11,877,332 B2
(45) Date of Patent: Jan. 16, 2024

(54) MASTER CELL GROUP FAILURE HANDLING BY A MASTER NODE

(71) Applicant: TELEFONAKTIEBOLAGET LM ERICSSON (PUBL), Stockholm (SE)

(72) Inventors: Osman Nuri Can Yilmaz, Espoo (FI); Stefan Wager, Espoo (FI); Oumer Teyeb, Solna (SE); Patrik Rugeland, Stockholm (SE); Antonino Orsino, Masala (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 188 days.

(21) Appl. No.: 16/930,573

(22) Filed: Jul. 16, 2020

(65) Prior Publication Data

US 2020/0351968 A1 Nov. 5, 2020

Related U.S. Application Data

(63) Continuation of application No. PCT/IB2020/050933, filed on Feb. 5, 2020.
(Continued)

(30) Foreign Application Priority Data

Feb. 11, 2019 (WO) ............... PCT/IB2019/051082

(51) Int. Cl.
*H04W 76/27* (2018.01)
*H04W 72/04* (2023.01)
(Continued)

(52) U.S. Cl.
CPC ........... *H04W 76/15* (2018.02); *H04W 24/10* (2013.01); *H04W 36/0058* (2018.08);
(Continued)

(58) Field of Classification Search
CPC ..... H04W 76/27; H04W 76/19; H04W 76/18; H04W 24/10; H04W 76/15;
(Continued)

(56) References Cited

U.S. PATENT DOCUMENTS 9,980,159 B2 * 5/2018 Tseng .................... H04W 48/00
10,123,370 B2 * 11/2018 Jung ..................... H04W 76/18
(Continued)

FOREIGN PATENT DOCUMENTS

CN 107690162 A 2/2018
JP 2015122735 A 7/2015
(Continued)

OTHER PUBLICATIONS

3rd Generation Partnership Project, "3rd Generation Partnership Project; Technical Specification Group Radio Access Network; Evolved Universal Terrestrial Radio Access (E-UTRA) and NR; Multi-connectivity; Stage 2 (Release 15)", Technical Specification, 3GPP TS 37.340 V15.4.0, pp. 1-34, Dec. 2018, 3GPP, France.
(Continued)

*Primary Examiner* — Sai Aung

(57) ABSTRACT

Systems, methods and apparatus are disclosed for user equipment and network nodes.
An example method performed by a user equipment (UE) includes the UE detecting a failure relating to a connection between the UE and a Master Cell Group (MCG). The UE provides, to a master node via a Secondary Cell Group, SCG, a first message relating to the detected failure. The UE receives, from the master node via the SCG, a second message indicating to the UE to perform a connection reconfiguration.
An example method performed by the master node includes the master node receiving, from the UE via the SCG, the first message including information relating to the detected fail-
(Continued)

ure of the connection between the UE and the MCG. The master node determines, based on the first message and a user equipment context, to perform a connection reconfiguration. The master node provides, to the UE via the SCG, the second message indicating to perform the connection reconfiguration.

21 Claims, 9 Drawing Sheets

Related U.S. Application Data

(60) Provisional application No. 62/804,806, filed on Feb. 13, 2019.

(51) Int. Cl.
*H04W 36/00* (2009.01)
*H04W 76/15* (2018.01)
*H04W 76/19* (2018.01)
*H04W 24/10* (2009.01)

(52) U.S. Cl.
CPC ....... *H04W 36/0069* (2018.08); *H04W 76/19* (2018.02); *H04W 76/27* (2018.02)

(58) Field of Classification Search
CPC . H04W 36/0079; H04W 36/08; H04W 36/30; H04W 16/28; H04W 36/0055; H04W 36/0094; H04W 72/042
See application file for complete search history.

(56) References Cited

U.S. PATENT DOCUMENTS

| | | | | |
|---|---|---|---|---|
| 2002/0155831 | A1* | 10/2002 | Fodor | H04W 24/00 |
| | | | | 455/426.1 |
| 2007/0287476 | A1* | 12/2007 | Jeong | H04W 76/10 |
| | | | | 455/456.6 |
| 2013/0121167 | A1* | 5/2013 | Wong | H04W 76/20 |
| | | | | 370/242 |
| 2015/0133122 | A1* | 5/2015 | Chen | H04W 36/0085 |
| | | | | 455/436 |
| 2016/0095004 | A1 | 3/2016 | Tseng | |
| 2017/0118680 | A1* | 4/2017 | Zhu | H04W 36/08 |
| 2019/0082363 | A1* | 3/2019 | Park | H04W 76/18 |
| 2019/0246442 | A1* | 8/2019 | Park | H04L 5/0055 |
| 2020/0029389 | A1* | 1/2020 | Yilmaz | H04W 76/18 |
| 2020/0120522 | A1* | 4/2020 | Xiao | H04W 36/28 |
| 2020/0288338 | A1* | 9/2020 | Freda | H04W 76/19 |

FOREIGN PATENT DOCUMENTS

| | | |
|---|---|---|
| JP | 2019510445 A | 4/2019 |
| JP | 2020511842 A | 4/2020 |
| RU | 26673792 A | 1/2017 |
| WO | 2017166293 A1 | 10/2017 |
| WO | 2017196412 A1 | 11/2017 |
| WO | 2018028969 A1 | 2/2018 |
| WO | 2018057076 A1 | 3/2018 |
| WO | 2018170885 A1 | 9/2018 |

OTHER PUBLICATIONS

Ericsson, "MCG failure handling in case of NE-DC and NR-DC", 3GPP TSG-RAN WG2#103bis, Chengdu, China, Oct. 8-12, 2018, pp. 1-3, Change Request R2-1814561, 3GPP.

Ericsson, "MCG failure handling in case of NE-DC and NR-DC", 3GPP TSG-RAN WG2#103bis, Chengdu, China, Oct. 8-12, 2018, pp. 1-4, Tdoc R2-1814559 (Revision of R2-1812017), 3GPP.

Ericsson, "RLM and RLF in case of LTE-NR tight interworking", 3GPP TSG-RAN WG2 #97bis, Spokane, USA, Feb. 3-7, 2017, pp. 1-4, Tdoc R2-1702711, 3GPP.

Ericsson, "MCG failure handling in case of NE-DC and NN-DC (TP to 37.340)", 3GPP TSG-RAN WG2 #103, Gothenburg, Sweden, Aug. 20-24, 2018, pp. 1-5, Tdoc R2-1812017 (Revision of R2-1809949), 3GPP.

* cited by examiner

MASTER CELL GROUP FAILURE HANDLING BY A MASTER NODE

RELATED APPLICATION

The present application is a continuation of International Application No. PCT/IB2020/050933, filed Feb. 5, 2020, which claims the benefit of and priority to U.S. Provisional Patent Application No. 62/804806, filed Feb. 13, 2019, entitled "MASTER CELL GROUP FAILURE HANDLING BY A MASTER NODE" and international application PCT/IB2019/051082, filed Feb. 11, 2019, entitled "MASTER CELL GROUP FAILURE HANDLING BY A SECONDARY NODE," the disclosures of which are hereby incorporated herein by reference in their entirety.

TECHNICAL FIELD

The present disclosure relates to wireless communication systems such as cellular networks, and more particularly to methods, user equipments, and network nodes for handling a communication failure in dual and/or multiple connectivity network environments.

BACKGROUND

In the 3$^{rd}$ Generation Partnership Project (3GPP), a dual-connectivity (DC) network environment has been specified, both for Long Term Evolution (LTE) and between LTE and New Radio (NR). Relevant portions of the 3GPP specification include 36.331 and 38.331. DC includes a master node and a secondary node, while Multi-connectivity (MC) includes additional nodes. DC has been proposed as a solution in Ultra Reliable Low Latency Communications (URLLC) use-cases to enhance robustness and to avoid connection interruptions.

Dual Connectivity (DC)

There are different ways to deploy a 5G network with or without interworking with LTE (also referred to as E-UTRA) and evolved packet core (EPC). In principle, NR and LTE can be deployed without any interworking, denoted by NR stand-alone (SA) operation. That is, an NR base station (gNB) can be connected to a 5G core network (5GC) and an LTE base station (eNB) can be connected to EPC with no interconnection between the two. On the other hand, the first supported version of NR is the so-called EN-DC (E-UTRAN-NR Dual Connectivity). In such a deployment, dual connectivity between NR and LTE is applied with an eNB as the master node (referred to as an MeNB) and gNB as the secondary node (referred to as an SgNB). On the other hand, a gNB master node may be referred to as a MgNB and an eNB secondary node may be referred to as a SeNB.

The radio access network (RAN) node supporting NR may not have a control plane connection to the core network, and instead may rely on an MeNB. This is also called "Non-standalone NR." In this scenario the functionality of an NR cell is limited and would be used for connected mode user equipments (UEs) as a booster and/or diversity leg, but a UE in an RRC_IDLE mode would not be able to camp on these NR cells.

With introduction of 5GC, other options may be also valid. As mentioned above, stand-alone NR deployment is supported where a gNB is connected to a 5GC. Similarly, an eNB can also be connected to a 5GC. This configuration may also be known as eLTE, E-UTRAN/5GC, or LTE/5GC and the node can be referred to as an ng-eNB. In these cases, both NR and LTE are seen as part of the NG-RAN, and both the ng-eNB and the gNB can be referred to as NG-RAN nodes. There are other variants of dual connectivity between LTE and NR that will be standardized as part of NG-RAN connected to 5GC, denoted by MR-DC (Multi-Radio Dual Connectivity). Under the MR-DC umbrella, options include:

EN-DC: The master node in an LTE node and the secondary node is an NR node (EPC CN employed)
NE-DC: The master node is an NR node and the secondary node is an LTE node (5GCN employed)
NGEN-DC: The master node in an LTE node and the secondary node is an NR node (5GCN employed)
NR-DC: Dual connectivity, where both the master and secondary nodes are NR nodes (5GCN employed).

As migration for these options may differ for different network operators, it is possible to have deployments with multiple options in parallel in the same network. For example, in combination with dual connectivity solutions between LTE and NR it is also possible to support CA (Carrier Aggregation) in each cell group, such as a Master Cell Group (MCG) and a secondary cell Group (SCG), and dual connectivity between nodes on same Radio Access Technology (RAT), for example, NR-NR DC. The SCG is a group of serving cells associated with a secondary node and the MCG is a group of serving cells associated with a master node. For LTE cells, a consequence of these different deployments is the co-existence of LTE cells associated with eNBs connected to EPC, 5GC or both EPC/5GC.

For EN-DC, the major changes compared to LTE DC are:
The introduction of a split bearer from the secondary node (known as SCG split bearer);
The introduction of a split bearer for RRC; and
The introduction of a direct RRC from the secondary node (also referred to as SCG SRB).

Split RRC messages are mainly used for creating diversity, and the sender can decide to either choose one of the links for scheduling the RRC messages, or it can duplicate the message over both links. In the downlink, the path switching between the MCG or SCG legs or duplication on both is left to network implementation. On the other hand, for the uplink (UL), the network configures the UE to use the MCG, SCG or both legs.

RRC Connection Re-Establishment in LTE

Upon the initiation of a re-establishment procedure in LTE, the UE suspends all RBs except signaling radio bearer 0 (SRB0). The UE will then send the RRCConnectionReestablishmentRequest message on SRB0. At this stage, the UE will either receive a RRCConnectionReestablishment or a RRCConnectionReestablishmentReject message on SRB0. In case the UE receives an RRCConnectionReestablishment, it will re-establish SRB1 and send the RRCConnectionReestablishmentComplete message on SRB1. According to 36.331, the network is not allowed to start sending downlink (DL) messages on SRB1 until it receives the RRCConnectionReestablishmentComplete message.

In case the UE gets back an RRCConnectionReestablishmentReject message, it will perform actions upon leaving an RRC connected state and inform the Non-Access Stratum (NAS) layer about an RRC connection failure. This will trigger the NAS layer to perform recovery, which includes a new RRC connection setup. All these response messages after the transmission of an RRC connection re-establishment request message are sent on SRB0, which means that they are not encrypted or integrity protected.

Background on RRC Connection Reestablishment in NR

The E-UTRA re-establishment procedure was revisited during NR standardization and in RAN2#101 in Sanya. Some aspects have been agreed to be enhanced to speed up the failure recovery, for example in case of handover failures. These enhancements include the following:

RRCReestablishment on SRB1: The RAN2 understanding was that there was no fundamental reason why the UE could not re-establish PDCP for SRB1 and resume SRB1 in the DL before submitting MSG3 to lower layers. This would make it possible to use SRB1 for MSG4 instead of SRB0, which would in turn make it possible to send a subsequent RRC reconfiguration message in conjunction with MSG4 or directly after instead of waiting for the UE response in MSG5, which would save a roundtrip in the re-establishment of data radio bearers (DRBs);

RRCSetup message in response to an RRCReestablishmentRequest message: The RAN2 understanding was that it would also be possible to support faster NAS recovery in the RAN in the case that the RAN is not able to re-establish the UE context (for example, when a cell is not prepared during handover failure). This could be done by the network sending an RRC connection setup message on SRB0 (instead of an RRC re-establishment reject message) which could be used to initiate normal RRC connection setup; and RRCReestablishmentReject message was removed: The RAN2 understanding was that this was not needed any longer because of a fallback procedure. If the UE tries to re-establish in a cell that is not prepared or that the network cannot re-establish the DRBs, the network can send an RRCSetup message. And, in the scenario where the cell is overloaded, network may simply wait until the failure timer T301 expires, so that the UE would enter RRC_IDLE and would perform access control before trying again.

Radio Link Failure

In LTE, a UE determines a radio link failure (RLF) based on:

detecting a certain number of out of sync indications from the lower layers associated with the PCell (Primary Cell) within a given time;

a random access problem indication from MAC; or an indication from radio link control (RLC) that a maximum number of retransmissions has been reached for an SRB or for a DRB.

When an RLF is detected, the UE prepares an RLF report, which includes, among other information, the measurement status of the serving and neighbor cells at the moment when RLF was detected. The UE goes to IDLE mode, selects a cell following IDLE mode cell selection procedure (the selected cell could be the same serving node/cell or another node/cell) and starts the RRC re-establishment procedure, with a cause value set to rlf-cause.

In the case of LTE DC, the RLF detection procedure is similar to what was described above except that: for the out of sync indications are detected with respect to the PCell of the master node; the MAC is for the MCG MAC entity; the RLC is for the MCG; and the DRB in corresponds to the MCG and MCG-split DRBs. If the RLF is detected on the MCG, then the UE triggers the RRC re-establishment procedure. Accordingly, the RRC connection on the MCG and SCG would be released and a new RRC connection would be re-established.

On the other hand, for a failure relating to the secondary node, known as SCGFailure, the failure is determined based on:

detecting radio link failure for the SCG, as discussed above (replace PCell with PSCell, MCG MAC for SCG MAC, and MCG/MCG-Split DRB for SCG DRB);

SCG change failure (i.e., not able to finalize SCG change within a certain duration after the reception of an RRC connection reconfiguration message instructing the UE to do so); or stopping uplink transmission towards the PSCell due to exceeding the maximum uplink transmission timing difference when powerControlMode is configured to 1.

Upon detecting SCGFailure, the UE sends an SCGFailureInformation message towards the master node, which also includes measurement reports, and the master node can either release the secondary node, change the secondary node/Cell, or reconfigure the SCG. Thus, a failure on the SCG will not lead to a re-establishment to be performed on the MCG.

3GPP has agreed to adopt the same principles in the context of EN-DC (i.e., re-establishment in the case of RLF on the master leg and recovery via SCGFailureInformation and secondary node release/change/modification in case of RLF on the secondary leg). Specifically, it has been agreed that for SgNB failures, the UE shall:

Suspend all SCG DRBs and suspend SCG transmission for MCG split DRBs, and SCG split DRBs;

Suspend direct SCG SRB and SCG transmission for MCG split SRB;

Reset SCG-MAC; and

Send the SCGFailureInformation message to the MeNB with corresponding cause values.

SUMMARY

The examples disclosed in the present disclosure provide techniques for improving efficiency of communications in a radio access network by allowing a user equipment (UE) to send a failure message (such as a FailureInformation message) to the master node upon detecting a Master Cell Group (MCG) related failure. In some examples, the UE provides the message to the master node via the SCG leg of a split SRB. In other examples, the UE provides the message via SRB3 to a secondary node, which then provides the message to the master node. Once the failure message is received by the master node, the master node can perform actions to address the failure. By allowing the master node to take actions to address the failure, signaling such as radio resource control (RRC) re-establishment related signaling may be avoided, thereby reducing signaling in the network. The techniques described herein further include network signaling and UE actions and procedures to enable these actions to be triggered by the master node.

A system of one or more computers can be configured to perform particular operations or actions corresponding to the above examples by virtue of having software, firmware, hardware, or a combination thereof installed on the system that in operation causes or cause the system to perform the actions. One or more computer programs can be configured to perform particular operations or actions corresponding to the above examples by virtue of including instructions that, when executed by data processing apparatus, cause the apparatus to perform the actions.

In an example, a method performed by a master node in a radio access network (RAN), includes the master node receiving, from a user equipment (UE) via a Secondary Cell Group (SCG), a first message including information relating to a detected failure of a connection between the UE and a Master Cell Group (MCG). The method further includes the master node determining, based on the first message and a user equipment context, to perform a connection reconfiguration. The method further includes the master node providing, to the UE via the SCG, a second message indicating to perform the connection reconfiguration.

In another example, a method performed by a user equipment (UE), includes the UE detecting a failure relating to a connection between the UE and a Master Cell Group (MCG). The method further includes the UE providing, to the master node via a Secondary Cell Group (SCG), a first message relating to the detected failure. The method further includes the UE receiving, from the master node via the SCG, a second message indicating to the UE to perform a connection reconfiguration.

In yet other examples, a system including the user equipment and/or network node are provided that perform one or both of the above methods. Further, the present disclosure also provides a non-transitory computer-readable storage medium comprising computer instructions stored thereon that, when executed by a processing circuit, cause the processing circuit to perform either of the above methods.

BRIEF DESCRIPTION OF THE DRAWINGS

For a more complete understanding of the disclosed embodiments and their features and advantages, reference is now made to the following description, taken in conjunction with the accompanying drawings.

DETAILED DESCRIPTION

Figure 1:
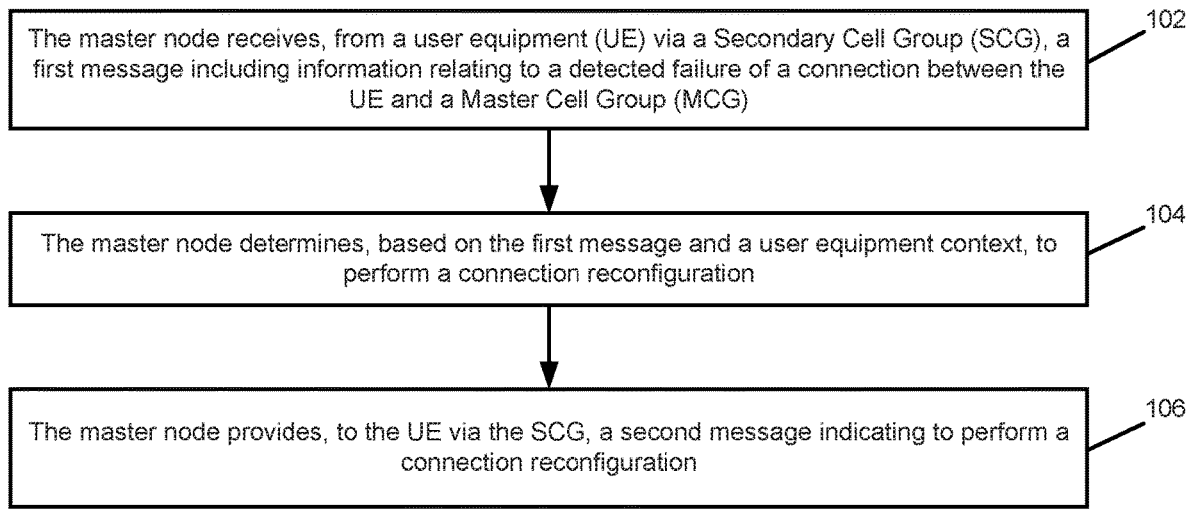
FIG. 1 is a flow diagram illustrating a method for handling a failure by a master node in a RAN network, according to some examples.

Conventional networking techniques have communication inefficiencies that may result in long service interruptions when responding to communication failures. For example, when an RLF occurs on the MCG, the UE releases the MCG SCells, and the whole SCG configuration except for the radio bearer configurations, and applies default configurations for the PCell. All radio bearers except SRB0 are also suspended. Then, the UE searches for a suitable cell with sufficient signal quality. When a suitable cell is found, the UE triggers the RRC re-establishment procedure towards the selected node/cell with RRC re-establishment request message. If the target doesn't have the UE context available or was not able to verify the context, the re-establishment fails, and the UE enters an RRC_IDLE state and performs NAS recovery (i.e. establish the connection from scratch). As a result of the failure of the re-establishment, there is a long service interruption.

On the other hand, (i) if the target is the same as the source node/cell and the RLF was due to temporary radio problem, or (ii) if the target is different from the source but was able to fetch the context of the UE from the source or already has the context (for example, if the failure was during handover), the re-establishment request will be accepted by the network and a re-establishment message is sent to the UE, to establish SRB1. Afterwards, upon the reception of a re-establishment complete message from the UE, the network sends an RRC reconfiguration message that will optionally reconfigure and resume the SRB2/DRBs, since they were suspended on RLF detection. The network could configure SCG during this first reconfiguration after re-establishment or wait to get measurement reports from the UE before performing a reconfiguration.

While the successful re-establishment described above is faster than performing a NAS recovery, random access is still used to send the re-establishment request. A re-establishment is sent over SRB0 radio bearers, which are suspended, and the SCells and SCG configurations are released on RLF. This causes additional delay to be incurred before the UE is up and running again with a proper DC configuration.

Thus, in both the successful and failed re-establishment scenarios as described above, there are performance degradations of services during RLF, especially for delay-sensitive applications.

The techniques described herein address the issues described above, and provide useful improvements to technology, resulting in more efficient network communications and faster recovery from failures. For example, RRC re-establishment procedures may be avoided and signaling may be reduced. In some examples, this technique includes the following steps for a UE and network nodes.

A method performed by a UE that is configured with dual connectivity with an SRB3 and/or a split SRB1 includes detecting a failure on the MCG. The UE creates a first message (such as a FailureInformation message) that includes a failure cause, measurements, and/or other information to assist the master node in determining an action to take responsive to the failure. The UE determines whether to transmit the first message via SCG part of SRB1 or via SRB3. In some examples, this is based on priorities transmitted by the network, through UE policies, or the cause of failure. The UE then transmits the first message to the network via the selected path. Upon the UE receiving a second message from the master node, such as an RRC message (for example, RRCReconfiguration, RRCReestablishment, RRCSetup) via SRB3 or the SCG part of SRB1, the UE executes a process associated with the message.

A method performed by network nodes includes the master node receiving a first message (such as a FailureInformation message) indicating a failure in the MCG. The master node may receive the message via the SCG path of a split SRB1, or via inter-node RRC message and/or via X2AP or XnAP from an secondary node that received the message via SRB3 from the UE. Because the message is transmitted via the secondary node, the secondary node may determine, based on the first message, to forward the whole message, parts of the message, or create a new message conferring the content or intentions of the message received from the UE. The master node receives the first message and determines an action to take responsive to the failure. Accordingly, the master node prepares a second message (such as an RRCReconfiguration, RRCReestablishment, or RRCSetup message), which it sends to the UE. If the master node received the first message from the UE via the SCG part of SRB1, the master node sends the second message to the UE via the SCG part of SRB1. If the master node received the first message from the secondary node pertaining to the failure information (such as the FailureInformation message, or another message related to the information in that message), the master node sends the second message to the secondary node, which the secondary node in turn sends to the UE via SRB3. When the UE receives the second message, the UE performs a process corresponding to the action indicated by the message.

Accordingly, if an RLF is detected on the MCG and either split SRB1 or SRB3 (or both) are configured, these techniques allow the UE to send a failure message/report to the master node via one of these two SRBs so that the master node can take the necessary actions. Thus, it is possible to avoid an RRC re-establishment procedure with the associated service interruption and reduce the signaling required.

Although some of the techniques are shown with examples using NR, the techniques can be applied to other RATs, such as E-UTRA, by using corresponding messages and procedures. For instance, in MR-DC with E-UTRA as master node (i.e. EN-DC, NGEN-DC), the UE can be configured with SRB3 and/or split SRB1 and can be used to report the MCG failure to the E-UTRA master node. Similarly, in MR-DC with E-UTRA as secondary node (i.e. NE-DC), the UE can be configured with a split SRB1 which can be used to inform the master node via the secondary node that the MCG has failed. Further, it is worth noticing that the format of the RRC messages is different based on the MR-DC option considered and the node (i.e., eNB/gNB) that generate it. Accordingly, the format of the RRC message may be given according to the node that generates the message. For example, if an RRC message is generated by an eNB, the message may be provided in an LTE format, whereas if the RRC message is generated by a gNB, then the message may be provided in an NR format.

FIG. 1 is a flow diagram illustrating an example method for handling a failure by a master node in a RAN network. It is understood that one or more of the master node steps performed in this method may be performed in combination with one or more of the steps performed by the UE that are discussed in detail with respect to FIG. 2. Moreover, the method may use any of the example communication protocols described with respect to FIGS. 3 and 7, and any of the example communication sequences described with respect to FIGS. 4-6 and 8.

Figure 3:
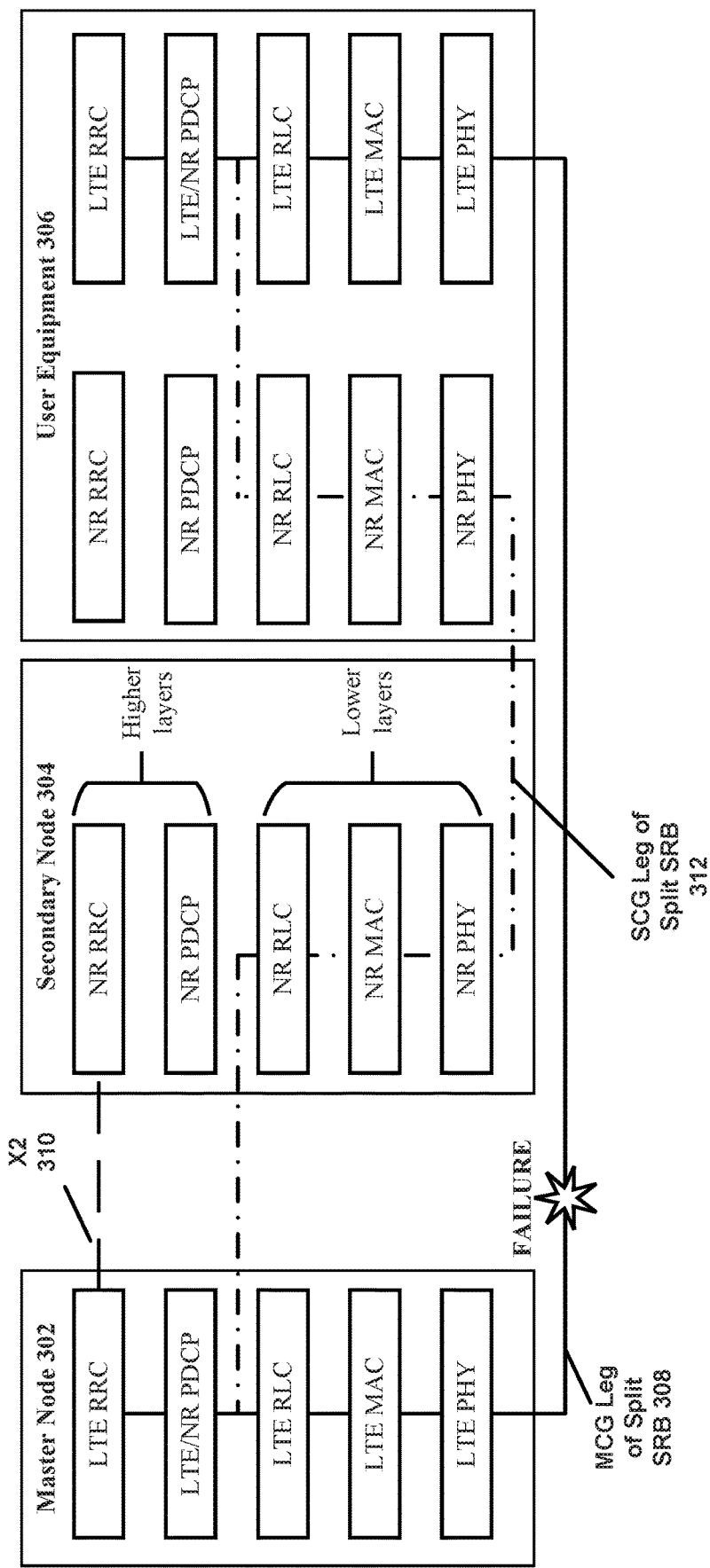
FIG. 3 is a block diagram illustrating a failure corresponding to an MCG SRB, and a corresponding communication with an secondary node, according to some examples.
Figure 7:
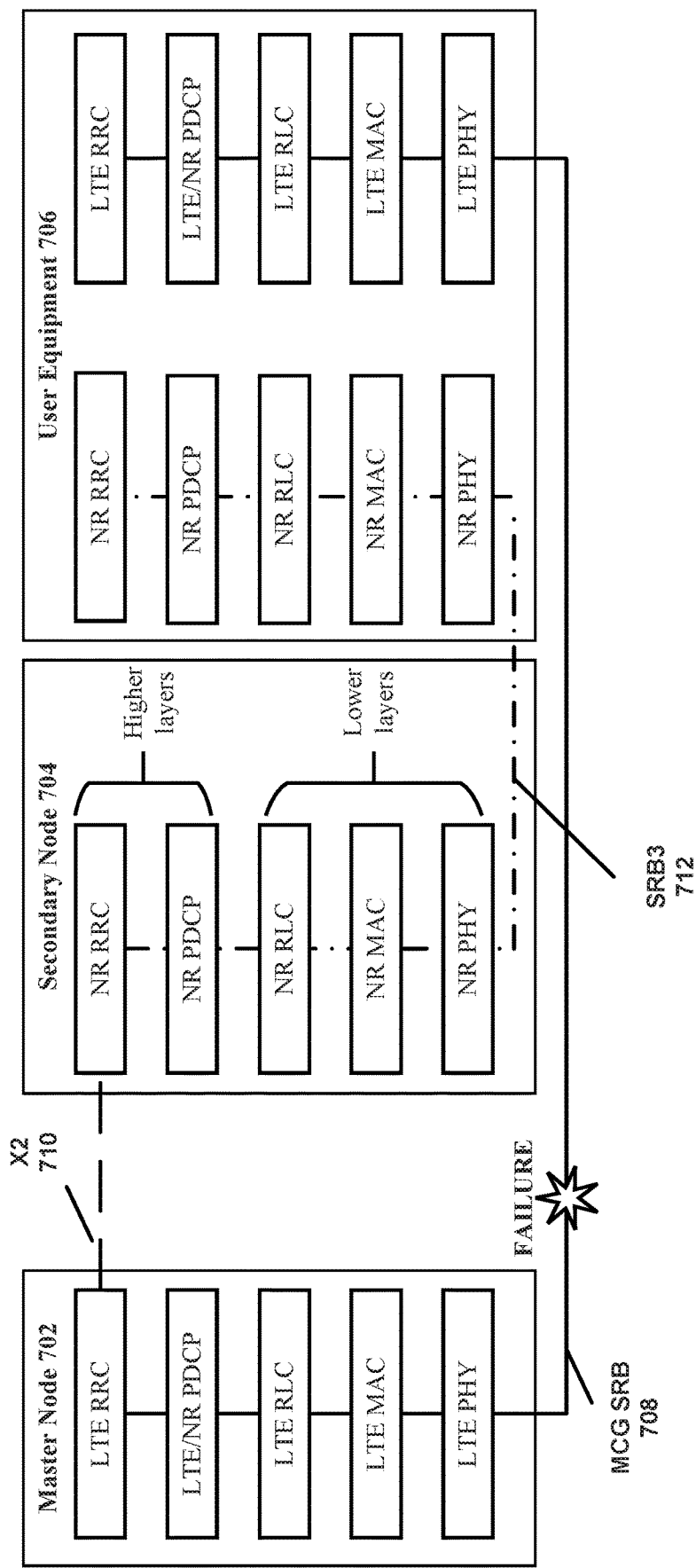
FIG. 7 is a block diagram illustrating a failure corresponding to an MCG SRB, and a corresponding communication with an secondary node, according to some examples.

At step 102, a master node in a radio access network (RAN) receives, from a user equipment (UE) via a Secondary Cell Group (SCG), a first message including information relating to a detected failure of a connection between the UE and a Master Cell Group (MCG). For example, as shown in FIG. 3, there may be a failure of a connection between the master node 302 and the UE 306 on the MCG leg of split SRB 308. For example, as shown in FIG. 7, there may be a failure between the master node 702 and the UE 706 on the MCG SRB 708.

In some examples, the detected failure is at least one of: a radio link failure (RLF), handover failure, reconfiguration failure, or integrity protection failure. In some examples, the first message includes a failure cause, one or more measurements (which may be provided in measurement report(s)), and/or other status report or failure recovery information. More detail regarding the information that the UE may provide in the first message is discussed with respect to step 204 of FIG. 2.

The first message may be a failure report message, which in some examples is a Radio Resource Control (RRC) FailureInformation message, MCGFailureInformation message, or an extension (such as a modified version) of these messages that are specified in TS 38.331. In other examples, the first message is an RRCReestablishmentRequest message, or extension thereof.

In some examples, the UE provides the first message to the master node via an SCG path of a split SRB1. In other examples, the UE provides the first message to the secondary node via SRB3, and the secondary node then provides the information regarding the failure to the master node via inter-node RRC message and/or via X2AP or XnAP.

At step 104, the master node determines, based on the first message and a user equipment context, to perform a connection reconfiguration. In other examples, the master node may determine to perform a connection re-establishment or a connection setup.

The master node may make a more informed determination regarding the action to take in response to the failure when the user equipment includes in the first message information such as measurements, beam failure information (such as BeamFailureRecovery information), a buffer status report information, and failure cause information. For example, the measurements may indicate one of the following, which causes the master node to make the corresponding determination:

The PCell is still the best cell, and failure was due to other reason like integrity verification failure or reconfiguration failure. master node sends a reconfiguration message with sync to resume the suspended bearers. Since UE continues using the configuration used prior to the reception of RRCReconfiguration message (in case of reconfiguration failure), even a delta configuration with just reconfiguration with sync suffices. DC is maintained with the original master node and secondary node nodes and MCG/SCG configurations;

Another cell that belongs to the master node is the best cell. master node sends a reconfiguration message with sync to handover to this cell. DC is maintained with the original master node and secondary node nodes, MCG configuration updated (PCell is changed), SCG configurations kept;

Another cell that belongs to a node different from the master node and secondary node is the best cell. The master node initiates inter-master node handover without secondary node change procedure;

Another cell that belongs to a node different from the master node and secondary node is the best cell, and there is another node that has cells better than the secondary node. The master node initiates an inter-master node handover with secondary node change;

The PScell is the best cell, and the radio conditions of the master node cells are not good. The master node initiates a master node to eNB/gNB change and/or master node to secondary node handover making secondary node the new master node (or new eNB/gNB in case of stand-alone operation); or The PScell is the best cell, and the radio conditions of the master node cells are still good enough for an secondary node role. The master node initiates a master node to secondary node role switch.

At step 108, the master node provides, to the UE via the SCG, a second message relating to the determined action, which in the present example is a connection reconfiguration. In the present example, the master node determines the type and content of the second message based on the determined action.

In some examples, the master node provides the second message to the UE via an SCG path of a split SRB1. In other examples, the master node provides the second message to the secondary node via inter-node RRC message and/or via X2AP or XnAP, and the secondary node provides the information to the UE via SRB3. Accordingly, the secondary node may examine and/or parse the content of the message received from the master node via and create an equivalent RRC message (for example, including the same or similar content, but possibly with a different transaction ID) to send to the UE via SRB3.

In some examples, when the master node determines to perform a handover, the second message is an RRCReconfiguration message, which causes the UE to execute a handover to the secondary node (or another node) so that the secondary node (or another node) becomes the new master node/MCG. The second message may include a handover configuration corresponding to the secondary node or another cell. Moreover, based on the user equipment context, the second message may specify a full or delta configuration including one or more of a bearer configuration, measurement configuration, or lower layer configuration.

In other examples, when the master node determines to perform a connection re-establishment, the second message may be an RRCReestablishment message that includes a NextHopChainingCount parameter that is used to re-establish security. In yet other examples, when the master node determines to perform a connection setup, the second message may be an RRCSetup message that causes UE to fallback to an RRC_IDLE state.

Figure 2:
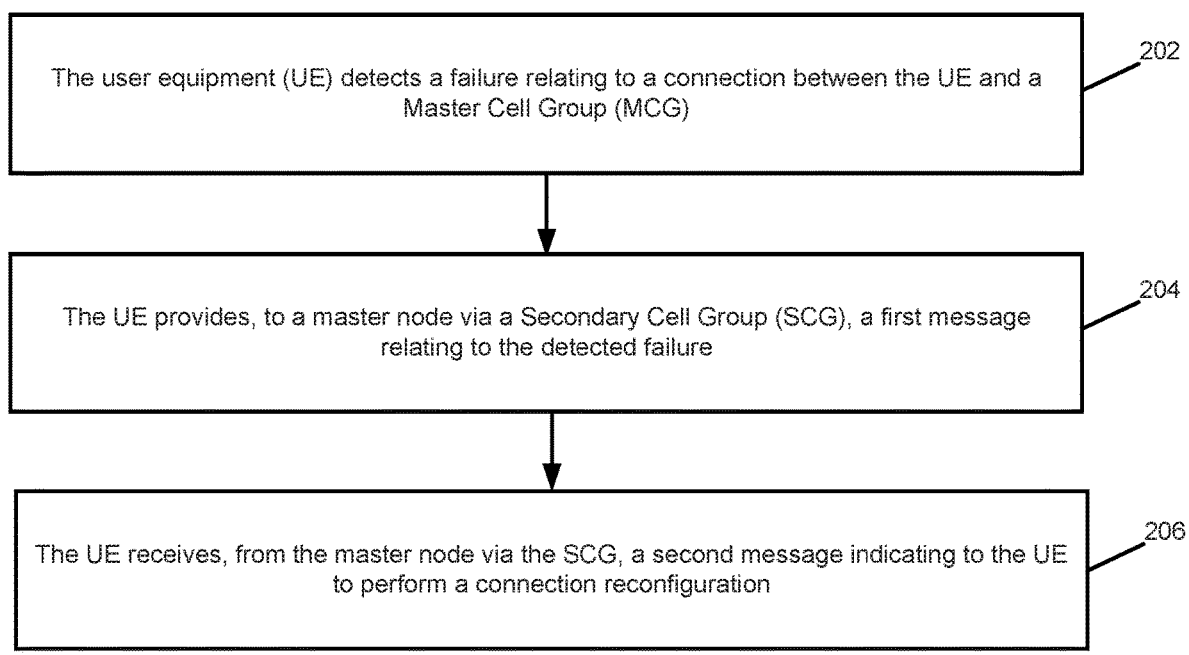
FIG. 2 is a flow diagram illustrating a method for handling a failure by a UE in a RAN network, according to some examples.

FIG. 2 is a flow diagram illustrating an example method for handling a failure by a UE in a RAN network. It is understood that one or more of the UE steps performed in this method may be performed in combination with one or more of the steps performed by the master node that are discussed in detail with respect to FIG. 1. Moreover, the method may use any of the example communication protocols described with respect to FIGS. 3 and 7, and any of the example communication sequences described with respect to FIGS. 4-6 and 8.

At step 202, the user equipment (UE) detects a failure relating to a connection between the UE and a master node in a radio access network, RAN. As shown in the present example, the failure is detected as relating to a connection between the UE and a group of serving cells (the MCG) associated with the master node. In some examples, the detected failure is at least one of: a radio link failure (RLF), handover failure, reconfiguration failure, or integrity protection failure.

At step 204, the UE provides, to the master node via a Secondary Cell Group (SCG), a first message relating to the detected failure. As discussed above, the first message may be a FailureInformation message, RRCReestablishmentRequest message, MCGFailureInformation message, an extension of one of these message types, or a new message type.

In some examples, the UE provides the first message to the master node via an SCG path of a split SRB1. In other examples, the UE provides the first message to the secondary node via SRB3, and the secondary node then provides the information regarding the failure to the master node via inter-node RRC message and/or via X2AP or XnAP.

It is helpful to for the UE include information in the first message to assist the master node with determining the corrective action to take responsive to the first message. Accordingly, the first message may include one or more of:

- A failure cause: failure causes that can lead to RLF may include one or more of an indication of a random access problem (randomAccessProblem), maximum retransmissions of RLC (rlc-MaxNumRetx), indication of a failure to comply with an RRC message or a failure to complete a reconfiguration before a timer expires (reconfigurationFailure), integrity failure (integrityProtectionFailure), maximum UL timing difference failure (maxUL-TimingDiff), or a beam failure (beamFailure);
- One or more measurements: measurement to be included may refer to the latest SCG and MCG measurements (i.e., inter-frequency and intra-frequency when available), which may be included in measurement reports. For example, particular measurement parameters may include ssbFreuency, refFreqCSI-RS, measResultServingCell, measResultNeighCellListNR, measResultNeighCellListEUTRA, or other measurements;
- A buffer status report: The type of traffic the UE has prior to the MCG failure and the importance of quickly re-establishing connectivity may be indicated by a buffer status report. In some examples, the buffer status report indicates how much data the UE has left in an UL buffer. If the UE has a lot of outstanding data in the buffer, the network could attempt to quickly setup DC again, whereas if the UE has neither pending DL nor UL traffic, the network may reconfigure the UE to a more robust single connectivity cell (e.g. at lower frequencies);
- BeamFailureRecovery information: In case the RLF was caused by a beam failure detection, the first message may indicate the BeamFailureRecoveryConfig information element that is used to configure the UE with RACH resources and candidate beams; or
- Security keys and/or MCG/SCG RRC configurations.

If the UE experiences failure on the MCG and transmits the FailureInformation via the SCG part of the split SRB1 or via SRB3, the UE will expect to receive a response from the network, (for example, an RRCReconfiguration, RRCReestablishment, or RRCSetup message).

If the UE does not receive any response after a certain time, for example because the UE lost connection to the SCG as well, the UE may abort the procedure and e.g. fallback to RRC_IDLE. To enable this procedure, a new timer can be introduced (or an existing timer is reused) and upon expiry of the timer the UE e.g. fallback to RRC_IDLE. The configuration of the timer could be done e.g. using system information (e.g. in SIB1 in UE-TimersAndConstants) or using dedicated signaling in e.g. CellGroupConfig in the IE RLF-TimersAndConstant. Alternatively, the timer could be specified to a default value. Accordingly, in some examples, the timer (called Txxx) is started when the UE initiates provides the failure message.

At step 206, the UE receives, from the master node via the SCG, a second message indicating to the UE to perform a connection reconfiguration. In other examples, the second message indicates for the UE to perform a connection re-establishment or a connection setup.

In some examples, the UE receives the second message via an SCG path of a split SRB1. In other examples, the master node provides the second message to the secondary node via inter-node RRC message and/or via X2AP or XnAP, and the secondary node provides the information to the UE via SRB3. Accordingly, the secondary node may examine and/or parse the content of the message received from the master node via and create an equivalent RRC message (for example, including the same or similar content, but possibly with a different transaction ID) to send the UE via SRB3.

Based on the second message, the UE may execute a procedure to update its configuration corresponding to the received second message and responds to the network using an appropriate path. For example, if the UE is reconfigured, without changing the master node, the UE responds on the same path it received the RRC message from the network (SRB3 or split SRB1). However, if the UE executes a handover/reestablishment/setup, the UE is configured with a new SRB1 and the UE shall transmit the complete message over the new SRB1 (MCG path).

In more detail regarding a reconfiguration with handover, when the second message indicates to the UE to perform a handover (such as where the second message is an RRCReconfiguration message), the UE may execute a handover to the secondary node (or another node) so that the secondary node (or another node) becomes the new master node/MCG. Accordingly, the second message may include an updated security context and security keys, and may include a full or a delta configuration for reconfiguring the UE.

After the UE has updated its configuration with the received full or delta configuration, the UE may send a complete message (for example, RRCReconfigurationComplete, RRCReestablishmentComplete, RRCSetupComplete) on SRB1 to the secondary node (which is now the new master node) according to the new configuration. The UE may further discard its current secondary node security context and derive a new security context based on the received second message. Although, where the second message includes an RRC setup message, the security context may be updated in a subsequent message. The new master node may then perform actions such as a path switch procedure, and the UE context may be released from the previous master node.

In other examples, the second message may indicate to the UE to perform a connection re-establishment (such as when the second message is an RRCReestablishment message). The second message may include a NextHopChainingCount parameter that is used to re-establish security. In yet other examples, when the second message indicates to the UE to perform a connection setup (such as when the second message is an RRCSetup message), the second message may cause the UE to fallback to an RRC_IDLE state.

FIG. 3 is a block diagram illustrating an example failure corresponding to an MCG SRB, and a corresponding communication with an secondary node. While this example shows an interaction of a UE, master node, and secondary node in an EN-DC configuration, these messaging techniques may be applied to other networking configurations as well.

In the present example, a master node (master node 302) is communicatively coupled to a secondary node (secondary node 304) and a user equipment (UE 306). Because the master node 302 is an LTE node, it includes an LTE RRC (Radio Resource Control), PDCP (Packet Data Convergence Control), RLC (Radio Link Control), MAC (Medium Access Layer), and PHY (Physical) protocol stack. Because the secondary node 304 is an NR node, it includes an NR RRC, PDCP, RLC, MAC, and PHY protocol stack. As shown, the UE 306 includes both NR and LTE protocol stacks.

In the present example, a split SRB is configured, such that the master node 302 communicates with the UE 306 via an MCG leg of a split SRB 308, and the secondary node 304 communicates with the UE 306 via an SCG leg of a split SRB 312. In the present example, the secondary node 304 and the master node 302 are also configured to communicate via an X2 interface 310 (for example, using an X2AP or XnAP application protocol) that is established between the master node 302 and secondary node 304.

When a failure (such as an RLF) is detected on the MCG (as shown by the failure on the MCG leg of the split SRB 308), the UE sends a message (such as a failure report message) via the SCG leg of the split SRB 312 to the master node via the secondary node 304.

Figure 4:
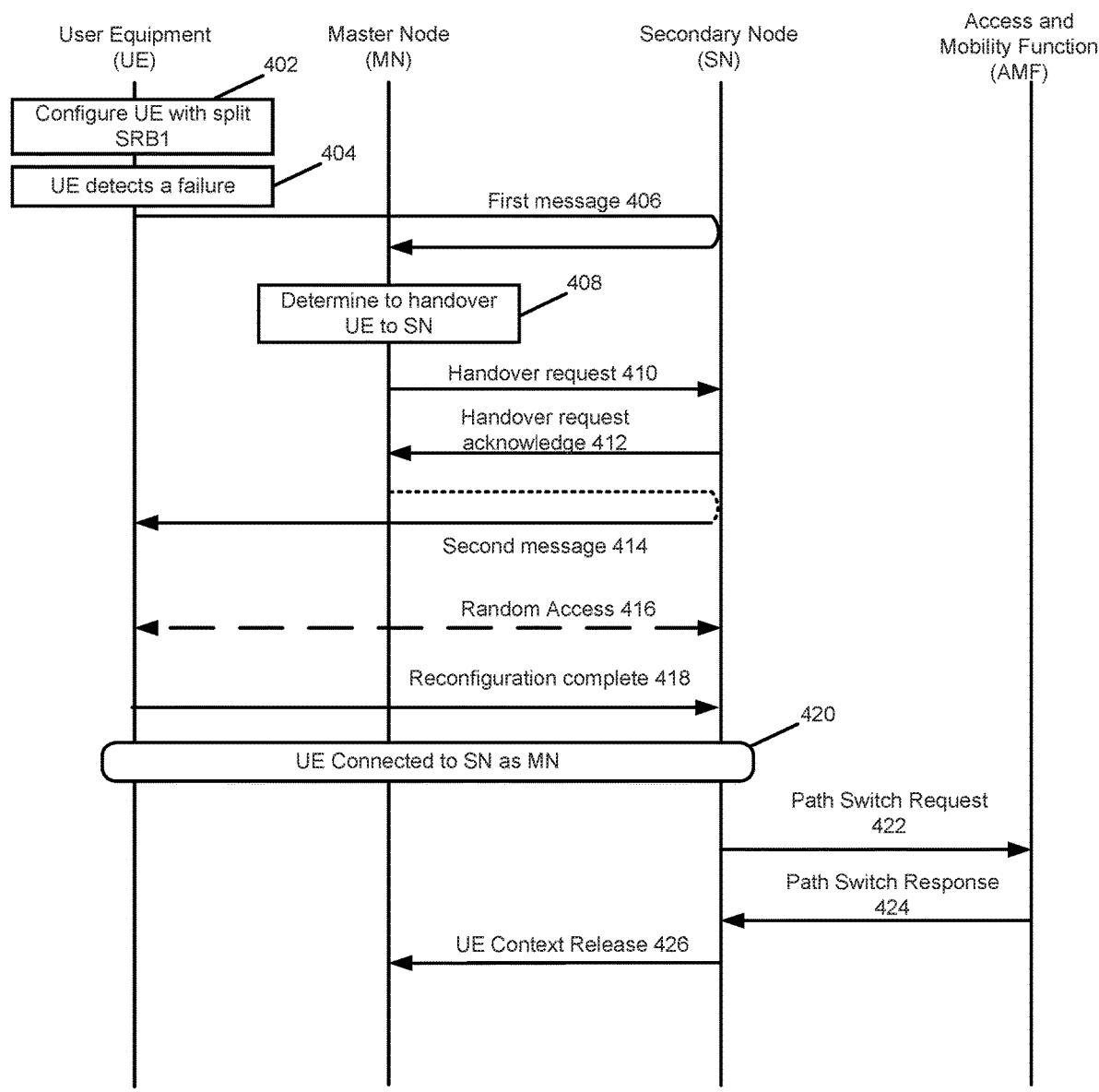
FIG. 4 is a sequence diagram illustrating connection reconfiguration with handover communications corresponding to failure handling by a master node in a RAN, according to some examples.
Figure 5:
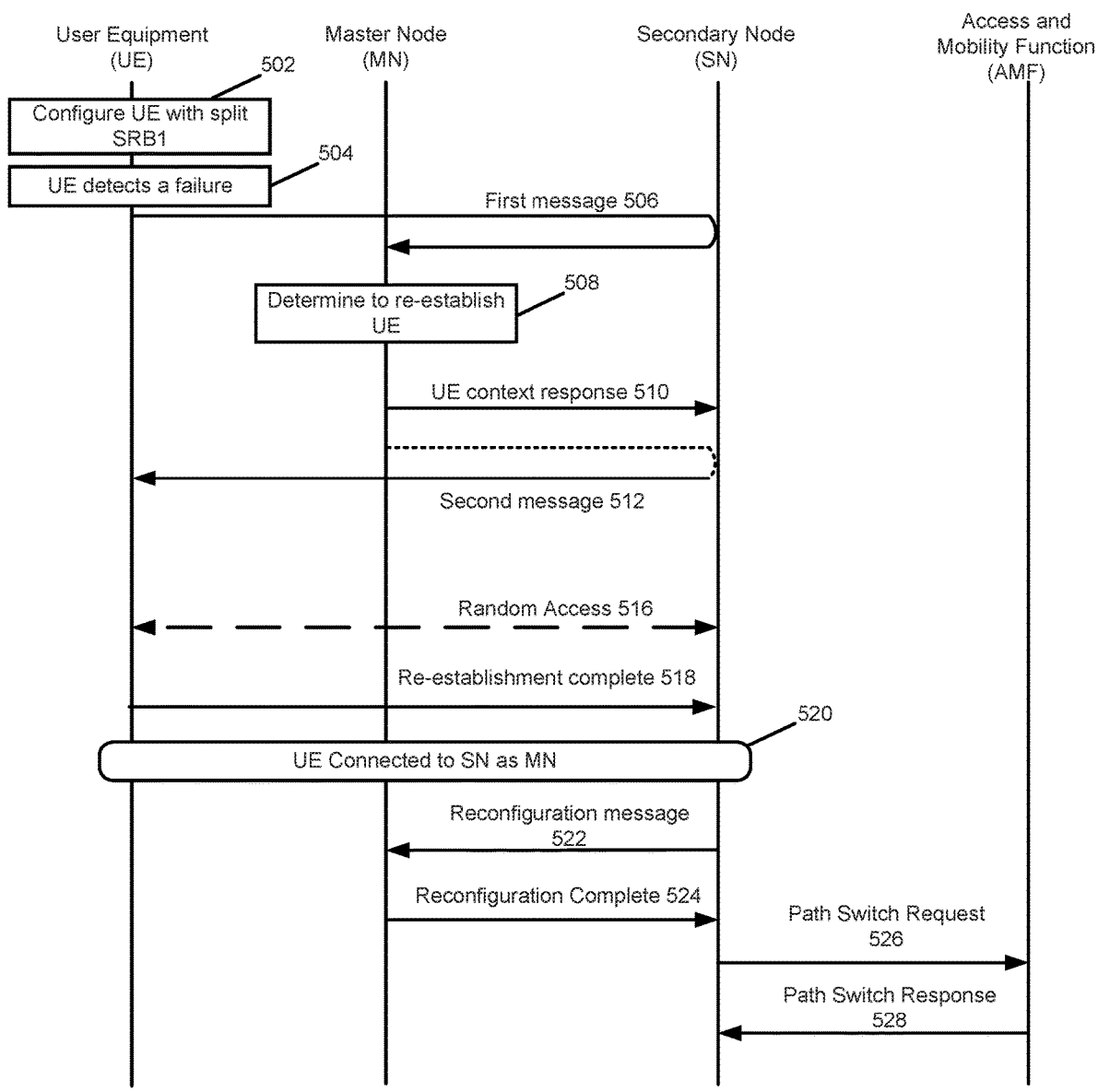
FIG. 5 is a sequence diagram illustrating connection re-establishment communications corresponding to failure handling by a master node in a RAN, according to some examples.
Figure 6:
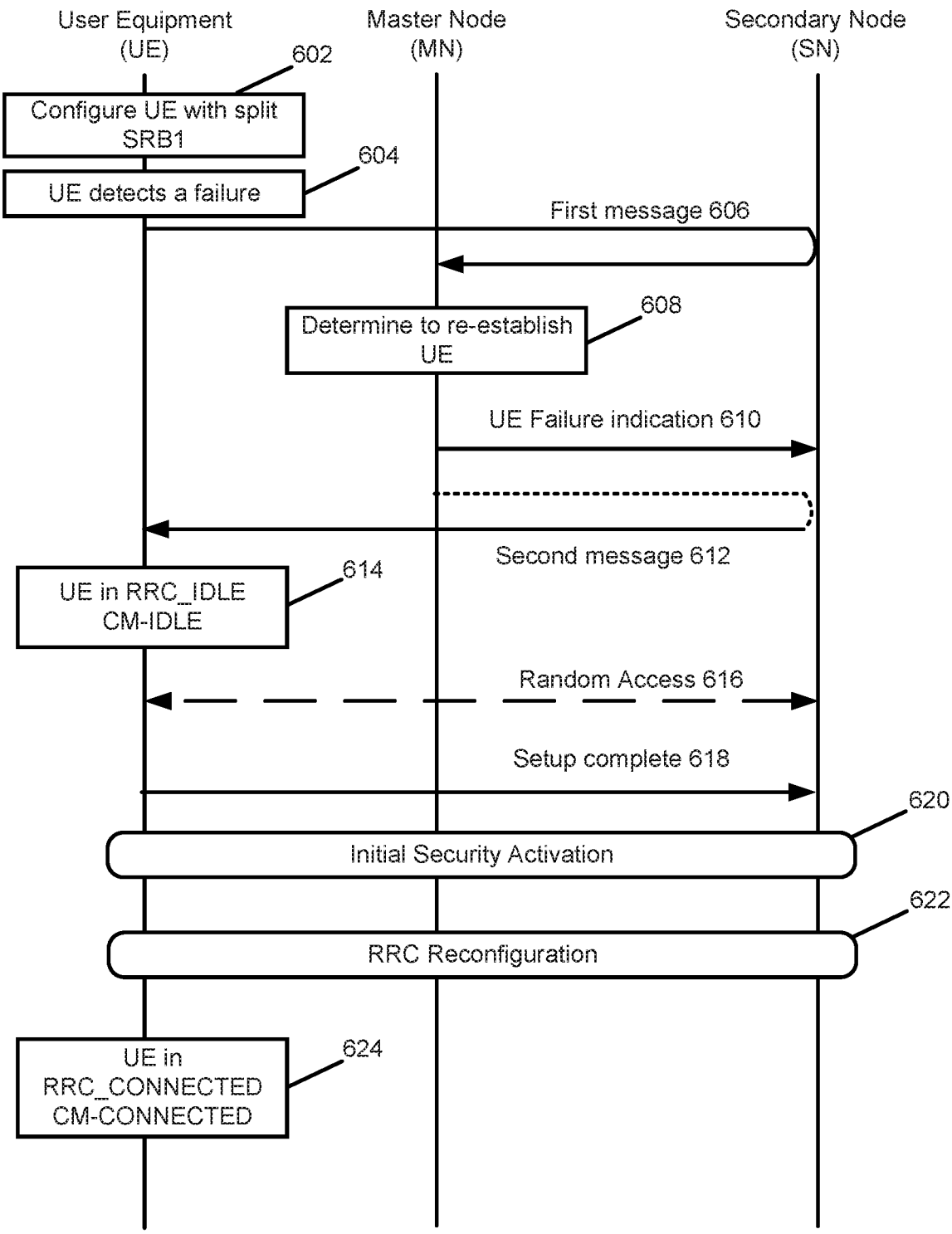
FIG. 6 is a sequence diagram illustrating connection setup communications corresponding to failure handling by a master node in a RAN, according to some examples.

After receiving the message, the master node 302 decides the action to perform (such as an RRC reconfiguration with/without handover, RRC re-establishment, or RRC setup). The master node 302 then sends a message (such as the RRC reconfiguration with/without handover, RRC re-establishment, or RRC setup message) corresponding to the decided action to the UE 306 via the SCG leg of the split SRB 312. The UE 306 may then execute a procedure corresponding to the received message, and send a complete message (such as RRCReconfigurationComplete, RRCReestablishmentComplete, RRCSetupComplete) to the network (such as by sending the message to master node 302 or secondary node 304) according to the new configuration. FIGS. 4-6 that are discussed below, provide example sequences that may be performed using the communication configuration shown in FIG. 3.

FIG. 4 is a sequence diagram illustrating an example of connection reconfiguration with handover communications corresponding to failure handling by a master node in a RAN. This example sequence shows particular communications that may be provided between the network elements to perform the steps described above with respect to FIGS. 1-3.

In this sequence, the master node determines to handover a UE to an secondary node. A new primary cell could be, for example, the source PSCell, a source SCell belonging to the SCG, or a new cell that belongs to the secondary node but that was not part of the UE's SCG configuration. In the present example, a random access procedure is performed to sync and time align with the new cell, such as when the selected cell was not part of the UE's SCG configuration.

At step 402, the UE is configured to communicate with the master node and the secondary node via a split SRB1. This configuration may be performed based on the UE receiving instructions from a network node, such as the master node or secondary node. In the present example, the UE is in an RRC_CONNECTED and CM-CONNECTED state.

At step 404, the UE detects a failure, such as an MCG RLF. At step 406, the UE sends, via the SCG leg of the split SRB1, a first message (such as a FailureInformation message) to the master node.

At step 408, the master node determines to handover the UE from the master node to the secondary node (in alternative embodiments, the master node decides to handover the UE to a cell belonging to a different node). Accordingly, at step 410, the master node sends a handover request to the secondary node, and at step 412 the secondary node acknowledges the handover request.

At step 414, the master node sends, via the SCG leg of the split SRB1, a second message to the UE. In the present example, the second message is an RRC reconfiguration message (for example, an RRCReconfiguration message). In some examples, the second message from the master node includes content that is used at the secondary node to generate a message that the secondary node sends to the UE. Accordingly, the second message may be an RRC reconfiguration message that is generated at the secondary node using content received at the secondary node from the master node.

At step 416, if the reconfiguration was an RRC reconfiguration with sync to update a security key, the second message triggers the UE performs a random access procedure. The UE then applies the configuration received in the second message. At step 418 the UE provides a complete message (for example, an RRCReconfigurationComplete message) to the secondary node via SRB1 using the new configuration. Accordingly, at block 420, the UE is connected to the secondary node, which has become the master node. The secondary node may then send the secondary node a HandoverComplete message to the master node to complete the inter-node procedure and inform the master node of handover success.

After the secondary node becomes the master node, the secondary node (the new master node) then sends at step 422 a path switch request to the AMF, which responds at step 424 with a path switch response. At step 426, the secondary node sends a UE Context Release message to the UE.

FIG. 5 is a sequence diagram illustrating an example of connection re-establishment communications corresponding to failure handling by a master node in a RAN. This example sequence shows particular communications that may be provided between the network elements to perform the steps described above with respect to FIGS. 1-3.

In this sequence, the master node determines that the UE cannot handover to the secondary node (for example, because of a reconfiguration failure or an integrity protection failure).

At step 502, the UE is configured to communicate with the master node and the secondary node via a split SRB1. In other examples, instead of a split SRB1, SRB3 is configured for communications between the secondary node and the UE. Accordingly, in the SRB3 configuration, the communications over the SCG leg of the split SRB1 would instead be performed via SRB3. The configuration of either the split SRB 1 or SRB3 may be performed based on the UE receiving instructions from a network node, such as the master node or secondary node. In the present example, the UE is in an RRC_CONNECTED and CM-CONNECTED state.

At step 504, the UE detects a failure, such as an MCG RLF. At step 506, the UE sends, via the SCG leg of the split SRB1, a first message, such as a FailureInformation message, to the master node.

At step 508, the master node determines to re-establish the UE. Accordingly, at step 510, the master node sends the secondary node a UE context response message (such as a modified UE context response or a new message that contains the UE context), which indicates to the secondary node that the UE shall perform an RRC re-establishment.

At step 512, the secondary node sends a second message to the UE. In the present example, the second message is an RRC re-establishment message (for example, an RRCEstablishment message). In some examples, the second message is an RRCReestablishment message containing a nextHopChainingCount (NCC), which the UE may use to re-establish security.

In some examples, the second message is sent from the secondary node to the UE via SRB0 or SRB3. In these examples where the second message is sent via SRB0, the UE monitors SRB0 (CCCH) from both the master node and secondary node after the transmission of the first message. In other examples, as indicated by the dashed line, content may be provided from the master node to the secondary node (such as via the SCG leg of the split SRB1) and this content may be (1) forwarded to the UE by the secondary node or (2) used by the secondary node to generate the second message that is sent to the UE. Accordingly, the second message may be generated at the master node and forwarded by the secondary node, or the second message may be generated at the secondary node using content received from the master node.

In examples where re-establishment is performed at a node that is different than the node that originated the re-establishment message (such as where the re-establishment is performed at a node that is different than the master node or secondary node), the re-establishment message may be modified to indicate the node where the re-establishment is to be performed. Accordingly, the master node may prepare an RRCReestablishment message with the NCC and indicate to the secondary node which NCC value is used.

At step 516, the second message triggers a random access procedure. After completing the re-establishment, at step 518 the UE provides a complete message (for example, an RRCReestablishmentComplete message) to the secondary node via SRB1. Accordingly, at block 520, the UE is connected to the secondary node, which has become the master node.

After the secondary node becomes the master node, at step 522, the secondary node sends a reconfiguration message (such as RRCReconfiguration message) to the UE. The reconfiguration message may configure the UE to operate in a standalone mode (with or without carrier aggregation) or a dual connectivity mode (with the secondary node being a node that is either the master node, secondary node, or a different node). Moreover, the reconfiguration message can be multiplexed with the second message (generally, a re-establishment message) such that the network doesn't wait for the re-establishment complete to send the reconfiguration message.

At step 524 responds with a reconfiguration complete message (such as an RRCReconfiguration complete message). The secondary node (the new master node) then sends at step 526 a path switch request to the AMF, which responds at step 528 with a path switch response.

FIG. 6 is a sequence diagram illustrating an example of connection setup communications corresponding to failure handling by a master node in a RAN. This example sequence shows particular communications that may be provided between the network elements to perform the steps described above with respect to FIGS. 1-3.

In this sequence, the master node determines to perform a fallback because it is unable to recover the UE connection. In some examples, this could be due to a failure of the UE to comply with a reconfiguration message (for example, a RRCReconfiguration message) or an integrity protection failure).

At step 602, the UE is configured to communicate with the master node and the secondary node via a split SRB1. In other examples, instead of a split SRB1, SRB3 is configured for communications between the secondary node and the UE. Accordingly, in the SRB3 configuration, the communications over the SCG leg of the split SRB1 described below would instead be performed via the SRB3. The configuration of either the split SRB 1 or SRB3 may be performed based on the UE receiving instructions from a network node, such as the master node or secondary node. In the present example, the UE is in an RRC_CONNECTED and CM-CONNECTED state.

At step 604, the UE detects a failure, such as an MCG RLF. At step 606, the UE sends, via the SCG leg of the split SRB1, a first message, such as a FailureInformation message, to the master node.

At step 608, the master node determines to re-establish the UE and perform a fallback. At step 610, the master node sends the secondary node a UE failure indication message. In some examples the UE failure indication message is a HANDOVER PREPARATION FAILURE message, HANDOVER CANCEL message, or RETRIEVE UE CONTEXT FAILURE message. The UE failure indication message may include a target node ID and a cause value.

At step 612, when the secondary node receives the UE failure indication message from the master node, the secondary node transmits a second message to the UE, such as an RRCSetup message that includes radioBearerConfig and cellGroupConfig configurations for SRB1. In other examples, as indicated by the dashed line, content may be provided from the master node to the secondary node (such as via the SCG leg of the split SRB1) and this content may be (1) forwarded to the UE by the secondary node or (2) used by the secondary node to generate the second message that is sent to the UE. Accordingly, the second message may be generated at the master node and forwarded by the secondary node, or the second message may be generated at the secondary node using content received from the master node. In some examples, where the second message is generated at the master node, NAS recovery may be performed towards the master node. In other examples, where the second message is generated at the secondary node, the NAS recovery may be performed towards the secondary node. In yet other examples, the second message may indicate another node that is different from the master node and secondary node for performing the NAS recovery.

In more detail regarding the second message, the master node and secondary node may coordinate radioBearerConfig and the cellGroupConfig configurations. For example, the master node may request secondary node configurations prior to generating the second message. In another example, the master node may inform the secondary node of configurations, such that the secondary node can re-use these configurations in generating the second message.

At step 614, the second message that is received at the UE causes the UE to fallback to an RRC_IDLE state.

At step 616, the second message triggers a random access procedure. After completing the re-establishment, at step 618 the UE provides a complete message (for example, an RRCSetupComplete message) to the secondary node via SRB1. At block 620, an initial security activation is performed. At block 622, an RRC reconfiguration is performed. Accordingly, at block 624, the UE is in an RRC_CONNECTED state.

FIG. 7 is a block diagram illustrating an example failure corresponding to an MCG SRB, and a corresponding communication with an secondary node. While this example shows an interaction of a UE, master node, and secondary node in an EN-DC configuration, these messaging techniques may be applied to other networking configurations as well.

In the present example, a master node (master node 702) is communicatively coupled to a secondary node (secondary node 704) and a user equipment (UE 706). Because the master node 702 is an LTE node, it includes an LTE RRC (Radio Resource Control), PDCP (Packet Data Convergence Control), RLC (Radio Link Control), MAC (Medium Access Layer), and PHY (Physical) protocol stack. Because the secondary node 704 is an NR node, it includes an NR RRC, PDCP, RLC, MAC, and PHY protocol stack. As shown, the UE 706 includes both NR and LTE protocol stacks.

In the present example, the secondary node 704 communicates with the UE 706 via SRB3. In the present example, the secondary node 704 and the master node 702 are also configured to communicate via an X2 interface 710 (for example, using an X2AP or XnAP application protocol) that is established between the master node 702 and secondary node 704.

When a failure (such as an RLF) is detected on the MCG (as shown by the failure on the MCG SRB 708), the UE sends a message (such as a failure report message) via SRB3 to the secondary node 704, which then forwards the message to the master node 702 via the X2 interface 710.

After receiving the message, the master node 702 decides the action to perform (such as an RRC reconfiguration with/without handover, RRC re-establishment, or RRC setup). The master node 702 then sends a message (such as the RRC reconfiguration with/without handover, RRC re-establishment, or RRC setup message) corresponding to the decided action to the secondary node 704, via the X2 interface 710. The secondary node 704 then communicates the determined action to the UE 706 via SRB3 712.

Figure 8:
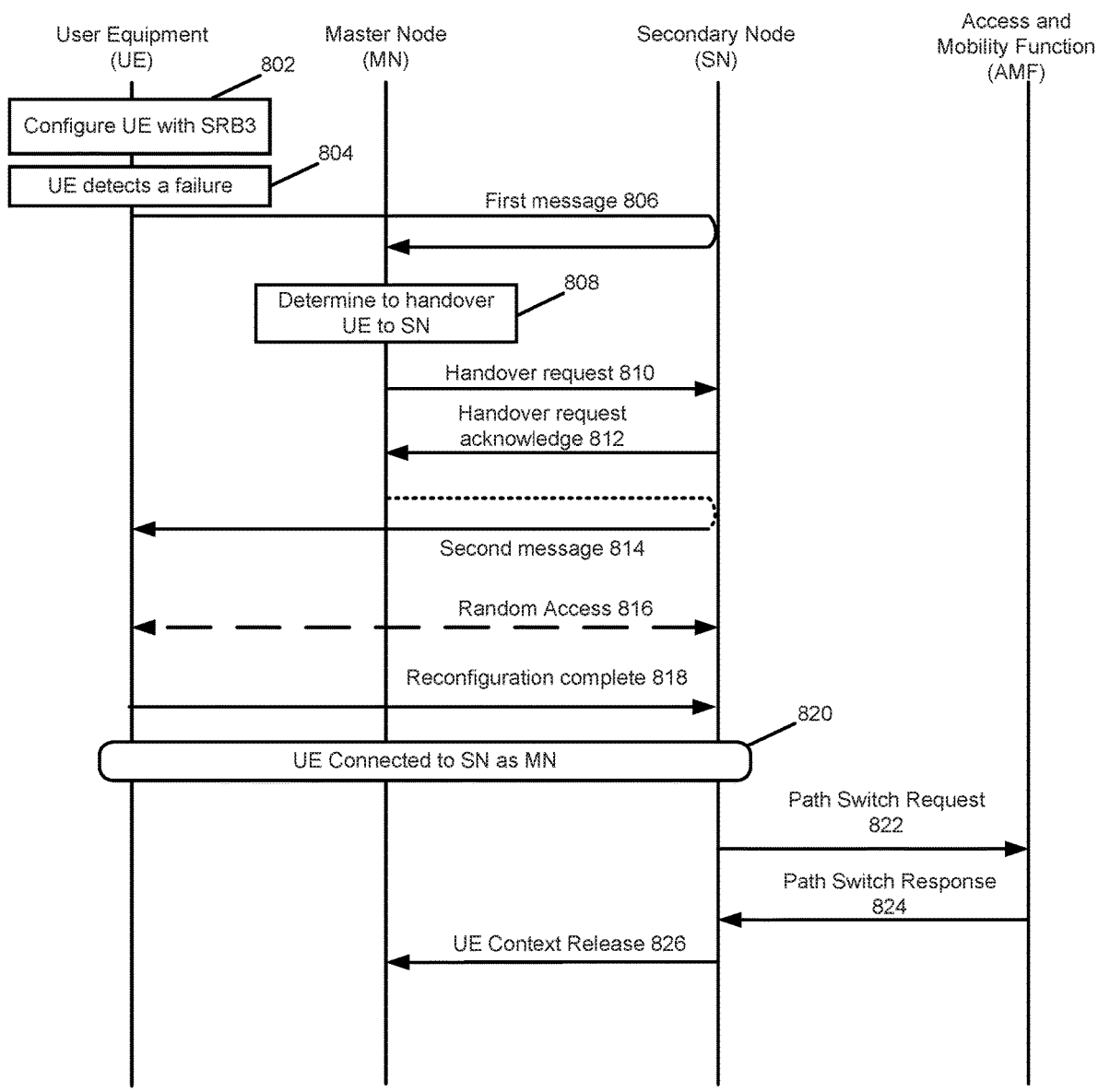
FIG. 8 is a sequence diagram illustrating connection reconfiguration with handover communications corresponding to failure handling by a master node in a RAN, according to some examples.

The UE 706 may then execute a procedure corresponding to the received message, and send a complete message (such as RRCReconfigurationComplete, RRCReestablishmentComplete, RRCSetupComplete) to the network (such as by sending the message to master node 702 or secondary node 704) according to the new configuration. FIG. 8 that is discussed below, provides an example sequence that may be performed using the communication configuration shown in FIG. 7.

FIG. 8 is a sequence diagram illustrating an example of connection reconfiguration with handover communications corresponding to failure handling by a master node in a RAN. This example sequence shows particular communications that may be provided between the network elements to perform the steps described above with respect to FIGS. 1, 2, and 7.

In this sequence, the master node determines to handover a UE to an secondary node. A new primary cell could be, for example, the source PSCell, a source SCell belonging to the SCG, or a new cell that belongs to the secondary node but that was not part of the UE's SCG configuration. In the present example, a random access procedure is performed to sync and time align with the new cell, such as when the selected cell was not part of the UE's SCG configuration.

At step 802, the UE is configured to communicate with the secondary node via SRB3. This configuration may be performed based on the UE receiving instructions from a network node, such as the master node or secondary node. In the present example, the UE is in an RRC_CONNECTED and CM-CONNECTED state.

At step 804, the UE detects a failure, such as an MCG RLF. At step 806, the UE sends, via SRB3, a first message (such as a FailureInformation message) to the secondary node. The secondary node sends information corresponding to the first message, such as by forwarding the first message, to the master node. In the present example, the secondary node sends the information (such as the forwarded first message) to the master node via inter-node RRC message and/or via X2AP or XnAP. In some examples, the first message received at the secondary node is an secondary node RRC message that has an embedded master node RRC message (that includes failure information from the UE) in a separate container. In other examples, the master node and secondary node employ the same RRC (for example, when they are using the same RAT), and the failure information is included in the secondary node's RRC without embedding it within a container.

At step 808, the master node determines to handover the UE from the master node to the secondary node (in alternative embodiments, the master node decides to handover the UE to a cell belonging to a different node). In other examples, the master node may determine to perform an RRC re-establishment or an RRC setup. In other examples, the master node may instead decide to handover the UE to another cell under the master node or to not perform handover.

In the present example, at step 810, the master node sends a handover request to the secondary node. This handover request may include an RRC inter-node message, such as a HandoverPreparationInfo message that includes the UE's current configuration. This allows the secondary node to provide a delta configuration to the UE. In other examples, if the master node determines to handover to a third node other than the master node or secondary node, then the handover messages are sent to the third node, and the below secondary node steps would instead be performed by that third node.

At step 812 the secondary node acknowledges the handover request.

At step 814, the secondary node sends a second message to the UE, via SRB3. In the present example, the second message is an RRC reconfiguration message (for example, an RRCReconfiguration message) that includes the UE's new configuration. The second message may, as indicated by the dashed line, include content from the master node that is used at the secondary node to generate the second message that the secondary node sends to the UE. Accordingly, the second message may be an RRC reconfiguration message (for example, an RRCReconfiguration message) that is forwarded by the secondary node, or generated at the secondary node using content received at the secondary node from the master node. The secondary node may receive the information from the master node via an inter-node RRC message, such as a CG-ConfigInfo message.

At step 816, if the reconfiguration was an RRC reconfiguration with sync, the second message triggers the UE performs the random access procedure. The reconfiguration with sync may be performed if the security key is changed. The UE applies the configuration received in the second message. After completing the reconfiguration, at step 818 the UE provides a complete message (for example, an RRCReconfigurationComplete message) to the secondary node via SRB1 using the new configuration. The secondary node may then send the secondary node a HandoverComplete message to the master node to complete the inter-node procedure and inform the master node of handover success. Accordingly, at block 820, the UE is connected to the secondary node, which has become the master node.

After the secondary node becomes the master node, the secondary node (the new master node) then sends at step 822 a path switch request to the AMF, which responds at step 824 with a path switch response. At step 826, the secondary node sends a UE Context Release message to the UE.

Other Embodiments where Both Split SRB and SRB3 are Configured

If both split SRB and SRB3 are configured, then either can be used to send the failure message, depending on configuration by network or UE implementation. A few examples of these embodiments could be network controlled or UE controlled. In either case, if the network decides that the UE shall use one of the options (SRB3 or SCG leg of SRB1) instead of the other, if both are configured, the UE is instructed regarding this choice. This could be done by:

Introducing a new parameter in e.g., RRCReconfiguration or CellGroupConfig indicating the priority of the paths;
Specifying the prioritization in standardization:
    if both SRB3 and SCG SRB1 are configured, the UE shall use SRB3 for transmitting the FailureInformation message;
    if both SRB3 and SCG SRB1 are configured, the UE shall use SRB1 for transmitting the FailureInformation message.

The above guidelines could also be applicable to other UE initiated signaling where the UE transmits an RRC message to the network without prior request by the network (e.g., MeasurementReport). The selection could also depend the inter-node (X2/Xn) latency.

In some examples for network controlled embodiments:
If the secondary node has better processing capabilities/lower loads, it would be beneficial to transmit the FailureInformation message on SRB3 as the message would be processed by the secondary node and only the relevant information would be forwarded to the master node for the decision making;
If the master node and secondary node are multivendor, the preprocessing of the FailureInformation message by the secondary node and omission of irrelevant information before forwarding the content to the master node would require standardization of the message. The likely scenario is that such optimizations are left for implementation;
Based on Failure type
    If the FailureInformation related to the MCG is caused by Reconfiguration failure or Integrity Protection failure, then the error lies in the higher layers in the master node, specifically the RRC or PDCP layer respectively. In that case, transmission of the FailureInformation message over the split SRB would possibly also fail as it reaches the master node. In that case, the information could beneficially be transmitted to the secondary node over SRB3 in order to indicate to the network that this failure has occurred;
    If the FailureInformation related to the MCG is caused by RLF in MAC or RLC, then the error is likely confined in the lower layers of the master node and it could be beneficial to quickly provide the information to the master node by transmitting the FailureInformation over the split SRB1.
In some examples for UE embodiments:
The UE could have an internal prioritization to always use SRB3 if both SRB3 and split SRB1 are configured (or vice versa);
The UE could use the same SRB as the latest RRC message it has received prior to the failure (if the UE received its last message on SRB3, then it uses SRB3, and vice versa for split SRB1). This example can be extended to any variation of analyzing the path on which previous RRC messages have been received.

Figure 9:
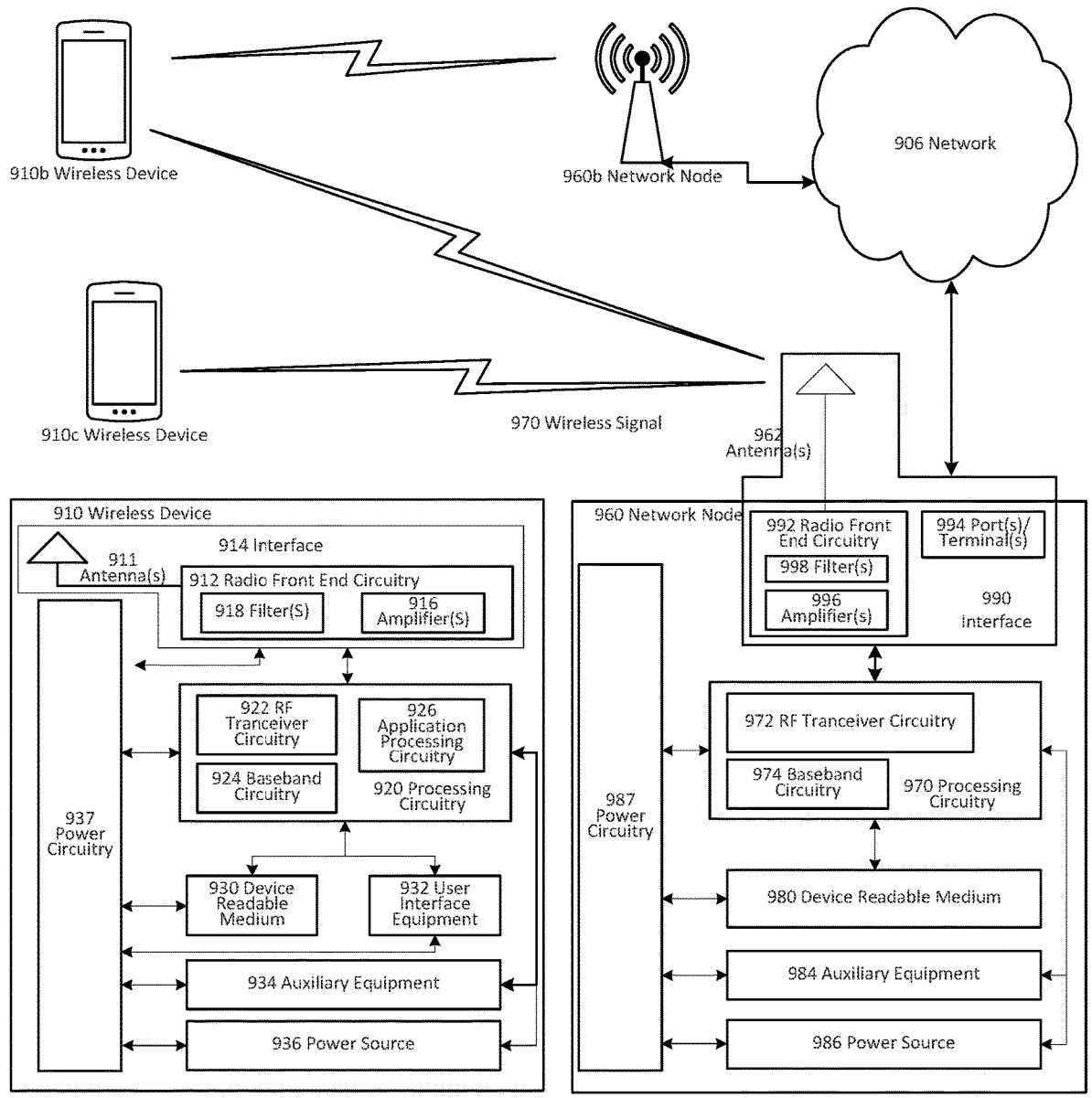
FIG. 9 is a block diagram illustrating a wireless network, according to some examples.

FIG. 9 is a block diagram illustrating an example wireless network. Although the subject matter described herein may be implemented in any appropriate type of system using any suitable components, the embodiments disclosed herein are described in relation to a wireless network. For simplicity, the wireless network of FIG. 9 depicts network 906, network nodes 960 and 960b, and wireless devices 910, 910b, and 910c. In practice, a wireless network may further include any additional elements suitable to support communication between wireless devices or between a wireless device and another communication device, such as a landline telephone, a service provider, or any other network node or end device. Of the illustrated components, network node 960 and wireless device (WD) 910 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 906 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 960 and WD 910 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 960 includes processing circuitry 970, device readable medium 980, interface 990, auxiliary equipment 984, power source 986, power circuitry 987, and antenna 962. Although network node 960 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of network node 960 are depicted as single boxes located within a larger box, or nested within multiple boxes, in practice, a network node may comprise multiple different physical components that make up a single illustrated component (e.g., device readable medium 980 may comprise multiple separate hard drives as well as multiple RAM modules).

Similarly, network node 960 may be composed of multiple physically separate components (e.g., a NodeB component and a RNC component, or a BTS component and a BSC component, etc.), which may each have their own respective components. In certain scenarios in which network node 960 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 960 may be configured to support multiple RATs. In such embodiments, some components may be duplicated (e.g., separate device readable medium 980 for the different RATs) and some components may be reused (e.g., the same antenna 962 may be shared by the RATs). Network node 960 may also include multiple sets of the various illustrated components for different wireless technologies integrated into network node 960, such as, for example, GSM, WCDMA, LTE, NR, WiFi, or Bluetooth wireless technologies. These wireless technologies may be integrated into the same or different chip or set of chips and other components within network node 960.

Processing circuitry 970 is configured to perform any determining, calculating, or similar operations (e.g., certain obtaining operations) described herein as being provided by a network node. These operations performed by processing circuitry 970 may include processing information obtained by processing circuitry 970 by, for example, converting the obtained information into other information, comparing the obtained information or converted information to information stored in the network node, and/or performing one or more operations based on the obtained information or converted information, and as a result of said processing making a determination.

Processing circuitry 970 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 960 components, such as device readable medium 980, network node 960 functionality. For example, processing circuitry 970 may execute instructions stored in device readable medium 980 or in memory within processing circuitry 970. Such functionality may include providing any of the various wireless features, functions, or benefits discussed herein. In some embodiments, processing circuitry 970 may include a system on a chip (SOC).

In some embodiments, processing circuitry 970 may include one or more of radio frequency (RF) transceiver circuitry 972 and baseband processing circuitry 974. In some embodiments, radio frequency (RF) transceiver circuitry 972 and baseband processing circuitry 974 may be on separate chips (or sets of chips), boards, or units, such as radio units and digital units. In alternative embodiments, part or all of RF transceiver circuitry 972 and baseband processing circuitry 974 may be on the same chip or set of chips, boards, or units In certain embodiments, some or all of the functionality described herein as being provided by a network node, base station, eNB or other such network device may be performed by processing circuitry 970 executing instructions stored on device readable medium 980 or memory within processing circuitry 970. In alternative embodiments, some or all of the functionality may be provided by processing circuitry 970 without executing instructions stored on a separate or discrete device readable medium, such as in a hard-wired manner. In any of those embodiments, whether executing instructions stored on a device readable storage medium or not, processing circuitry 970 can be configured to perform the described functionality. The benefits provided by such functionality are not limited to processing circuitry 970 alone or to other components of network node 960, but are enjoyed by network node 960 as a whole, and/or by end users and the wireless network generally.

Device readable medium 980 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 970. Device readable medium 980 may store any suitable instructions, data or information, including a computer program, software, an application including one or more of logic, rules, code, tables, etc. and/or other instructions capable of being executed by processing circuitry 970 and, utilized by network node 960. Device readable medium 980 may be used to store any calculations made by processing circuitry 970 and/or any data received via interface 990. In some embodiments, processing circuitry 970 and device readable medium 980 may be considered to be integrated.

Interface 990 is used in the wired or wireless communication of signalling and/or data between network node 960, network 906, and/or WDs 910. As illustrated, interface 990 comprises port(s)/terminal(s) 994 to send and receive data, for example to and from network 906 over a wired connection. Interface 990 also includes radio front end circuitry 992 that may be coupled to, or in certain embodiments a part of, antenna 962. Radio front end circuitry 992 comprises filters 998 and amplifiers 996. Radio front end circuitry 992 may be connected to antenna 962 and processing circuitry 970. Radio front end circuitry may be configured to condition signals communicated between antenna 962 and processing circuitry 970. Radio front end circuitry 992 may receive digital data that is to be sent out to other network nodes or WDs via a wireless connection. Radio front end circuitry 992 may convert the digital data into a radio signal having the appropriate channel and bandwidth parameters using a combination of filters 998 and/or amplifiers 996. The radio signal may then be transmitted via antenna 962. Similarly, when receiving data, antenna 962 may collect radio signals which are then converted into digital data by radio front end circuitry 992. The digital data may be passed to processing circuitry 970. In other embodiments, the interface may comprise different components and/or different combinations of components.

In certain alternative embodiments, network node 960 may not include separate radio front end circuitry 992, instead, processing circuitry 970 may comprise radio front end circuitry and may be connected to antenna 962 without separate radio front end circuitry 992. Similarly, in some embodiments, all or some of RF transceiver circuitry 972 may be considered a part of interface 990. In still other embodiments, interface 990 may include one or more ports or terminals 994, radio front end circuitry 992, and RF transceiver circuitry 972, as part of a radio unit (not shown), and interface 990 may communicate with baseband processing circuitry 974, which is part of a digital unit (not shown).

Antenna 962 may include one or more antennas, or antenna arrays, configured to send and/or receive wireless signals. Antenna 962 may be coupled to radio front end circuitry 992 and may be any type of antenna capable of transmitting and receiving data and/or signals wirelessly. In some embodiments, antenna 962 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 962 may be separate from network node 960 and may be connectable to network node 960 through an interface or port.

Antenna 962, interface 990, and/or processing circuitry 970 may be configured to perform any receiving operations and/or certain obtaining operations described herein as being performed by a network node. Any information, data and/or signals may be received from a wireless device, another network node and/or any other network equipment. Similarly, antenna 962, interface 990, and/or processing circuitry 970 may be configured to perform any transmitting operations described herein as being performed by a network node. Any information, data and/or signals may be transmitted to a wireless device, another network node and/or any other network equipment.

Power circuitry 987 may comprise, or be coupled to, power management circuitry and is configured to supply the components of network node 960 with power for performing the functionality described herein. Power circuitry 987 may receive power from power source 986. Power source 986 and/or power circuitry 987 may be configured to provide power to the various components of network node 960 in a form suitable for the respective components (e.g., at a voltage and current level needed for each respective component). Power source 986 may either be included in, or external to, power circuitry 987 and/or network node 960. For example, network node 960 may be connectable to an external power source (e.g., an electricity outlet) via an input circuitry or interface such as an electrical cable, whereby the external power source supplies power to power circuitry 987. As a further example, power source 986 may comprise a source of power in the form of a battery or battery pack which is connected to, or integrated in, power circuitry 987. The battery may provide backup power should the external power source fail. Other types of power sources, such as photovoltaic devices, may also be used.

Alternative embodiments of network node 960 may include additional components beyond those shown in FIG. 9 that may be responsible for providing certain aspects of the network node's functionality, including any of the functionality described herein and/or any functionality necessary to support the subject matter described herein. For example, network node 960 may include user interface equipment to allow input of information into network node 960 and to allow output of information from network node 960. This may allow a user to perform diagnostic, maintenance, repair, and other administrative functions for network node 960.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 910 includes antenna 911, interface 914, processing circuitry 920, device readable medium 930, user interface equipment 932, auxiliary equipment 934, power source 936 and power circuitry 937. WD 910 may include multiple sets of one or more of the illustrated components for different wireless technologies supported by WD 910, such as, for example, GSM, WCDMA, LTE, NR, WiFi, WiMAX, or Bluetooth wireless technologies, just to mention a few. These wireless technologies may be integrated into the same or different chips or set of chips as other components within WD 910.

Antenna 911 may include one or more antennas or antenna arrays, configured to send and/or receive wireless signals, and is connected to interface 914. In certain alternative embodiments, antenna 911 may be separate from WD 910 and be connectable to WD 910 through an interface or port. Antenna 911, interface 914, and/or processing circuitry 920 may be configured to perform any receiving or transmitting operations described herein as being performed by a WD. Any information, data and/or signals may be received from a network node and/or another WD. In some embodiments, radio front end circuitry and/or antenna 911 may be considered an interface.

As illustrated, interface 914 comprises radio front end circuitry 912 and antenna 911. Radio front end circuitry 912 comprise one or more filters 918 and amplifiers 916. Radio front end circuitry 912 is connected to antenna 911 and processing circuitry 920, and is configured to condition signals communicated between antenna 911 and processing circuitry 920. Radio front end circuitry 912 may be coupled to or a part of antenna 911. In some embodiments, WD 910 may not include separate radio front end circuitry 912; rather, processing circuitry 920 may comprise radio front end circuitry and may be connected to antenna 911. Similarly, in some embodiments, some or all of RF transceiver circuitry 922 may be considered a part of interface 914. Radio front end circuitry 912 may receive digital data that is to be sent out to other network nodes or WDs via a wireless connection. Radio front end circuitry 912 may convert the digital data into a radio signal having the appropriate channel and bandwidth parameters using a combination of filters 918 and/or amplifiers 916. The radio signal may then be transmitted via antenna 911. Similarly, when receiving data, antenna 911 may collect radio signals which are then converted into digital data by radio front end circuitry 912. The digital data may be passed to processing circuitry 920. In other embodiments, the interface may comprise different components and/or different combinations of components.

Processing circuitry 920 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 910 components, such as device readable medium 930, WD 910 functionality. Such functionality may include providing any of the various wireless features or benefits discussed herein. For example, processing circuitry 920 may execute instructions stored in device readable medium 930 or in memory within processing circuitry 920 to provide the functionality disclosed herein.

As illustrated, processing circuitry 920 includes one or more of RF transceiver circuitry 922, baseband processing circuitry 924, and application processing circuitry 926. In other embodiments, the processing circuitry may comprise different components and/or different combinations of components. In certain embodiments processing circuitry 920 of WD 910 may comprise a SOC. In some embodiments, RF transceiver circuitry 922, baseband processing circuitry 924, and application processing circuitry 926 may be on separate chips or sets of chips. In alternative embodiments, part or all of baseband processing circuitry 924 and application processing circuitry 926 may be combined into one chip or set of chips, and RF transceiver circuitry 922 may be on a separate chip or set of chips. In still alternative embodiments, part or all of RF transceiver circuitry 922 and baseband processing circuitry 924 may be on the same chip or set of chips, and application processing circuitry 926 may be on a separate chip or set of chips. In yet other alternative embodiments, part or all of RF transceiver circuitry 922, baseband processing circuitry 924, and application processing circuitry 926 may be combined in the same chip or set of chips. In some embodiments, RF transceiver circuitry 922 may be a part of interface 914. RF transceiver circuitry 922 may condition RF signals for processing circuitry 920.

In certain embodiments, some or all of the functionality described herein as being performed by a WD may be provided by processing circuitry 920 executing instructions stored on device readable medium 930, which in certain embodiments may be a computer-readable storage medium. In alternative embodiments, some or all of the functionality may be provided by processing circuitry 920 without executing instructions stored on a separate or discrete device readable storage medium, such as in a hard-wired manner. In any of those particular embodiments, whether executing instructions stored on a device readable storage medium or not, processing circuitry 920 can be configured to perform the described functionality. The benefits provided by such functionality are not limited to processing circuitry 920 alone or to other components of WD 910, but are enjoyed by WD 910 as a whole, and/or by end users and the wireless network generally.

Processing circuitry 920 may be configured to perform any determining, calculating, or similar operations (e.g., certain obtaining operations) described herein as being performed by a WD. These operations, as performed by processing circuitry 920, may include processing information obtained by processing circuitry 920 by, for example, converting the obtained information into other information, comparing the obtained information or converted information to information stored by WD 910, and/or performing one or more operations based on the obtained information or converted information, and as a result of said processing making a determination.

Device readable medium 930 may be operable to store a computer program, software, an application including one or more of logic, rules, code, tables, etc. and/or other instructions capable of being executed by processing circuitry 920. Device readable medium 930 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 920. In some embodiments, processing circuitry 920 and device readable medium 930 may be considered to be integrated.

User interface equipment 932 may provide components that allow for a human user to interact with WD 910. Such interaction may be of many forms, such as visual, audial, tactile, etc. User interface equipment 932 may be operable to produce output to the user and to allow the user to provide input to WD 910. The type of interaction may vary depending on the type of user interface equipment 932 installed in WD 910. For example, if WD 910 is a smart phone, the interaction may be via a touch screen; if WD 910 is a smart meter, the interaction may be through a screen that provides usage (e.g., the number of gallons used) or a speaker that provides an audible alert (e.g., if smoke is detected). User interface equipment 932 may include input interfaces, devices and circuits, and output interfaces, devices and circuits. User interface equipment 932 is configured to allow input of information into WD 910, and is connected to processing circuitry 920 to allow processing circuitry 920 to process the input information. User interface equipment 932 may include, for example, a microphone, a proximity or other sensor, keys/buttons, a touch display, one or more cameras, a USB port, or other input circuitry. User interface equipment 932 is also configured to allow output of information from WD 910, and to allow processing circuitry 920 to output information from WD 910. User interface equipment 932 may include, for example, a speaker, a display, vibrating circuitry, a USB port, a headphone interface, or other output circuitry. Using one or more input and output interfaces, devices, and circuits, of user interface equipment 932, WD 910 may communicate with end users and/or the wireless network, and allow them to benefit from the functionality described herein.

Auxiliary equipment 934 is operable to provide more specific functionality which may not be generally performed by WDs. This may comprise specialized sensors for doing measurements for various purposes, interfaces for additional types of communication such as wired communications etc. The inclusion and type of components of auxiliary equipment 934 may vary depending on the embodiment and/or scenario.

Power source 936 may, in some embodiments, be in the form of a battery or battery pack. Other types of power sources, such as an external power source (e.g., an electricity outlet), photovoltaic devices or power cells, may also be used. WD 910 may further comprise power circuitry 937 for delivering power from power source 936 to the various parts of WD 910 which need power from power source 936 to carry out any functionality described or indicated herein. Power circuitry 937 may in certain embodiments comprise power management circuitry. Power circuitry 937 may additionally or alternatively be operable to receive power from an external power source; in which case WD 910 may be connectable to the external power source (such as an electricity outlet) via input circuitry or an interface such as an electrical power cable. Power circuitry 937 may also in certain embodiments be operable to deliver power from an external power source to power source 936. This may be, for example, for the charging of power source 936. Power circuitry 937 may perform any formatting, converting, or other modification to the power from power source 936 to make the power suitable for the respective components of WD 910 to which power is supplied.

EMBODIMENTS

1. A method performed by a master node in a radio access network, RAN, the method comprising:
   receiving, via a secondary node, a first message including information generated by a user equipment, the information corresponding to a detected failure of a connection between the user equipment and the master node;
   determining, based on the first message and a user equipment context, to perform an action that includes at least one of: a connection reconfiguration, a connection re-establishment, or a connection setup; and
   providing, to the secondary node, a second message corresponding to the determined action.
2. The method according to embodiment 1, wherein the first message comprises a Radio Resource Control (RRC) FailureInformation message, RRCReestablishmentRequest message, or MCGFailureInformation message.
3. The method according to any of embodiments 1-2, wherein the first message includes one or more of: a failure cause, one or more measurements, a buffer status report, or BeamFailureRecovery information.
4. The method according to any of embodiments 1-3, wherein the detected failure comprises at least one of: a radio link failure, a reconfiguration failure, an integrity protection failure, or a handover failure.
5. The method according to any of embodiments 1-4, wherein the second message comprises a Radio Resource Control (RRC) RRCReconfiguration message, RRCReestablishment message, or RRCSetup message.
6. The method according to any of embodiments 1-5, wherein the first message is received via signaling radio bearer 3, SRB3.
7. The method according to any of embodiments 1-5, wherein the first message is received via a Secondary Cell Group (SCG) path of a split signaling radio bearer 1, SRB1.
8. The method according to any of embodiments 1-7, wherein the second message is provided via signaling radio bearer 3, SRB3.
9. The method according to any of embodiments 1-7, wherein the second message is provided via a Secondary Cell Group (SCG) path of a split signaling radio bearer 1, SRB1.
10. The method according to any of embodiments 1-9, wherein the determined action comprises a connection reconfiguration with handover.
11. The method according to any of embodiments 1-10, wherein the second message includes a handover configuration corresponding to the secondary node or another node.
12. A method performed by a user equipment, UE, comprising:
    detecting a failure corresponding to a connection between the UE and a master node in a radio access network, RAN;
    providing, to the master node via a secondary node, a first message corresponding to the detected failure; and
    receiving, from the master node via the secondary node, a second message indicating to the UE to perform a connection reconfiguration, a connection re-establishment, or a connection setup.
13. The method according to embodiment 12, wherein the first message comprises a Radio Resource Control (RRC) FailureInformation message, RRCReestablishmentRequest message, or MCGFailureInformation message.
14. The method according to any of embodiments 12-13, wherein the first message includes one or more of: a failure cause, one or more measurements, a buffer status report, or BeamFailureRecovery information.
15. The method according to any of embodiments 12-14, wherein the detected failure comprises at least one of: a radio link failure, a reconfiguration failure, an integrity protection failure, or a handover failure.
16. The method according to any of embodiments 12-15, wherein the second message comprises a Radio Resource Control (RRC) RRCReconfiguration message, RRCReestablishment message, or RRCSetup message.
17. The method according to any of embodiments 12-16, wherein the first message is provided via signaling radio bearer 3, SRB3.
18. The method according to any of embodiments 12-16, wherein the first message is provided via a Secondary Cell Group (SCG) path of a split signaling radio bearer 1, SRB1.
19. The method according to any of embodiments 12-18, wherein the second message is received via signaling radio bearer 3, SRB3.
20. The method according to any of embodiments 12-18, wherein the second message is received via a Secondary Cell Group (SCG) path of a split signaling radio bearer 1, SRB1.
21. The method according to any of embodiments 12-20, wherein the determined action comprises a connection reconfiguration with handover.
22. The method according to any of embodiments 12-21, wherein the second message includes a handover configuration corresponding to the secondary node or another node.
23. A network node (200) in a radio access network, RAN (220), the network node (200) comprising processing circuitry (202) to perform any of the methods of embodiments 1-11.
24. A user equipment, UE (210), comprising processing circuitry (212) to perform any of the methods of embodiments 12-22.
25. A non-transitory computer-readable storage medium having stored thereon instructions executable by processing circuitry to perform any of the methods of embodiments 1-22.
26. A system comprising:
    a network node; and
    a user equipment communicatively coupled to the network node.
27. The system of embodiment 26, wherein the network node comprises at least one processor coupled to a non-transitory computer readable memory, said non-transitory computer readable memory containing instructions executable by said at least one processor to perform any of the methods of embodiments 1-11.
28. The system of embodiment 26, wherein the user equipment comprises at least one processor coupled to a non-transitory computer readable memory, said non-transitory computer readable memory containing instructions executable by said at least one processor to perform any of the methods of embodiments 12-22.

FailureInformation Message Examples

The following shows an example extension of the FailureInformation message with measurements.

| FailureInformation message |
|---|
| ```
-- Asecondary node1START
-- TAG-FAILUREINFORMATION-START
FailureInformation ::=    SEQUENCE {
      criticalExtensions              CHOICE {
          failureInformation          FailureInformation-IEs,
          criticalExtensionsFuture    SEQUENCE { }
      }
}
FailureInformation-IEs ::=              SEQUENCE {
      failureInfoRLC-Bearer                   FailureInfoRLC-Bearer
          OPTIONAL,
      lateNonCriticalExtension        OCTET STRING            OPTIONAL,
      nonCriticalExtension            FailureInformation-rxx-IEs      OPTIONAL
}
FailureInformation-rxx-IEs ::=          SEQUENCE {
      measResultMCG-Failure-rxx               MeasResults-Failure
          OPTIONAL,
      measResultSCG-Failure                   MeasResults-Failure
          OPTIONAL,
      beamFailureRecoveryConfig               BeamFailureRecoveryConfig
          OPTIONAL,
      lateNonCriticalExtension        OCTET STRING            OPTIONAL,
      nonCriticalExtension            SEQUENCE { }            OPTIONAL
}
FailureInfoRLC-Bearer ::=               SEQUENCE {
      cellGroupId                             CellGroupId,
      logicalChannelIdentity                  LogicalChannelIdentity,
      failureType                             ENUMERATED {duplication, spare3,
spare2, spare1}
}
MeasResults-Failure-rxx ::=             SEQUENCE {
      measResultPerMOList             MeasResultList3NR,
      ...
}
MeasResultList3NR ::=           SEQUENCE (SIZE (1..maxFreq)) OF MeasResult3NR
MeasResult3NR ::=               SEQUENCE {
      ssbFrequency            ARFCN-ValueNR           OPTIONAL,
      refFreqCSI-RS           ARFCN-ValueNR           OPTIONAL,
      measResultServingCell           MeasResultNR            OPTIONAL,
      measResultNeighCellListNR       MeasResultListNR        OPTIONAL,
      measResultNeighCellListEUTRA    MeasResultListEUTRA     OPTIONAL,
      ...
}
-- TAG-FAILUREINFORMATION-STOP
-- Asecondary node1STOP
``` |

The following shows an example extension of the failure type in FailureMessage. Since the current FailureInformation IE, only has 3 spare values for failure type, the IE either can be extended, or the failure types can be restricted. In one embodiment, the spare values of the failureType are used such that the choice rlf comprise randomAccessProblem, maximum retransmissions of RLC, beamFailure, or max UL timing difference, whereas reconfigurationFailure encompass both failure to comply with the RRC message, as well as failure to complete a reconfiguration before a timer (e.g. T304) expires:

| FailureInformation message (without extensions) |
|---|
| ```
-- Asecondary node1START
-- TAG-FAILUREINFORMATION-START
FailureInformation ::=    SEQUENCE {
      criticalExtensions              CHOICE {
          failureInformation          FailureInformation-IEs,
          criticalExtensionsFuture    SEQUENCE { }
      }
}
FailureInformation-IEs ::=              SEQUENCE {
      failureInfoRLC-Bearer                   FailureInfoRLC-Bearer
          OPTIONAL,
      lateNonCriticalExtension        OCTET STRING            OPTIONAL,
      nonCriticalExtension            SEQUENCE { }            OPTIONAL
}
FailureInfoRLC-Bearer ::=                       SEQUENCE {
``` |

| FailureInformation message (without extensions) |
|---|
| cellGroupId                         CellGroupId,<br>logicalChannelIdentity           LogicalChannelIdentity,<br>failureType                      ENUMERATED {duplication, rlf, reconfigurationFailure, integrityProtectionFailure}<br>}<br>-- TAG-FAILUREINFORMATION-STOP<br>-- Asecondary node1STOP |

In another example, the FailureInformation message is extended to allow further failure types to be signaled.

| FailureInformation message (with extensions) |
|---|
| -- Asecondary node1START<br>-- TAG-FAILUREINFORMATION-START<br>FailureInformation ::= SEQUENCE {<br>    criticalExtensions         CHOICE {<br>        failureInformation     FailureInformation-IEs,<br>        criticalExtensionsFuture   SEQUENCE { }<br>    }<br>}<br>FailureInformation-IEs ::=         SEQUENCE {<br>    failureInfoRLC-Bearer          FailureInfoRLC-Bearer<br>    OPTIONAL,<br>    lateNonCriticalExtension      OCTET STRING         OPTIONAL,<br>    nonCriticalExtension          FailureInformation-rxx-IEs   OPTIONAL<br>}<br>FailureInformation-rxx-IEs ::=    SEQUENCE {<br>    failureInfoRLC-Bearer-rxx      FailureInfoRLC-Bearer-rxx<br>    OPTIONAL,<br>    lateNonCriticalExtension      OCTET STRING         OPTIONAL,<br>    nonCriticalExtension          SEQUENCE { }         OPTIONAL<br>}<br>FailureInfoRLC-Bearer ::=         SEQUENCE {<br>    cellGroupId                    CellGroupId,<br>    logicalChannelIdentity         LogicalChannelIdentity,<br>    failureType                    ENUMERATED {duplication, spare3, spare2, spare1}<br>}<br>FailureInfoRLC-Bearer-rxx ::=     SEQUENCE {<br>    cellGroupId                    CellGroupId,<br>    logicalChannelIdentity         LogicalChannelIdentity,<br>    failureType-rxx               ENUMERATED {t304-expiry, randomAccessProblem, rlc-MaxNumRetx, reconfigurationFailure, integrityProtectionFailure, maxUL-TimingDiff, beamFailure, spare1}<br>}<br>-- TAG-FAILUREINFORMATION-STOP<br>-- Asecondary node1STOP |

Exemplary NR Procedures

In the following section, an example of how to implement the techniques described herein in the current 3GPP specification e.g. TS 38.331 is shown. The examples show enhancements to several parts of the specifications, which may be implemented separately or jointly in different combinations.

---

53.5.8 Reconfiguration failure
53.5.8.1       Integrity check failure
Editor's Note: Removed "SIB3" from heading so that this sub-section can easily be expanded to stand-alone case (if considered necessary). FFS_Standalone
The UE shall:
1>    upon integrity check failure indication from NR lower layers for SRB3:
2>    initiate the SCG failure information procedure as specified in subclause 5.7.3 to report SRB3 integrity check failure.
1>    upon integrity check failure indication from NR lower layers for SRB1 or SRB2:
2>    If the UE is configured with split SRB1 or SRB3:
3>    initiate the failure information procedure as specified in subclause 5.7.5 to report integrity check failure.

```
2>     else:
3>         initiate RRC Re-establishment procedures as specified in subclause 5.3.7;
53.5.8.2       Inability to comply with RRCReconfiguration
The UE shall:
1>     if the UE is operating in EN-DC:
2>         if the UE is unable to comply with (part of) the configuration included in the
RRCReconfiguration message received over SRB3;
3>             continue using the configuration used prior to the reception of RRCReconfiguration
message;
3>             initiate the SCG failure information procedure as specified in subclause 5.7.3 to
report SCG reconfiguration error, upon which the connection reconfiguration procedure
ends;
2>         else, if the UE is unable to comply with (part of) the configuration included in the
RRCReconfiguration message received over E-UTRA MCG SRB1;
3>             continue using the configuration used prior to the reception of RRCReconfiguration
message;
3>             initiate the connection re-establishment procedure as specified in TS 36.331 [10,
5.3.7], upon which the connection reconfiguration procedure ends.
1>     else if RRCReconfiguration is received via NR:
2>         if the UE configured with split SRB1;
3>             if the UE is unable to comply with (part of) the configuration included in the
RRCReconfiguration message received over Split SRB1;
4>                 continue using the configuration used prior to the reception of RRCReconfiguration
message;
4>                 initiate the failure information procedure as specified in subclause 5.7.5 to report
MCG reconfiguration error, upon which the connection reconfiguration procedure ends;
2>         if the UE configured with SRB3;
3>             if the UE is unable to comply with (part of) the configuration included in the
RRCReconfiguration message received over SRB3;
4>                 continue using the configuration used prior to the reception of RRCReconfiguration
message;
4>                 initiate the SCG failure information procedure as specified in subclause 5.7.3 to
report SCG reconfiguration error, upon which the connection reconfiguration procedure
ends;
3>         if the UE is unable to comply with (part of) the configuration included in the
RRCReconfiguration message received over SRB1;
4>             continue using the configuration used prior to the reception of RRCReconfiguration
message;
4>             initiate the failure information procedure as specified in subclause 5.7.5 to report
MCG reconfiguration error, upon which the connection reconfiguration procedure ends;
2>     else:
3>         if security has not been activated:
4>             perform the actions upon going to RRC_IDLE as specified in 5.3.11, with release
cause other;
3>         else:
4>             initiate the connection re-establishment procedure as specified in 5.3.7, upon which
the reconfiguration procedure ends;
1>     else if RRCReconfiguration is received via other RAT (HO to NR failure):
2>         if the UE is unable to comply with any part of the configuration included in the
RRCReconfiguration message:
3>             perform the actions defined for this failure case as defined in the specifications
applicable for the other RAT.
NOTE 1:   The UE may apply above failure handling also in case the
RRCReconfiguration message causes a protocol error for which the generic error handling
as defined in 10 specifies that the UE shall ignore the message.
NOTE 2:   If the UE is unable to comply with part of the configuration, it does not
apply any part of the configuration, i.e. there is no partial success/failure.
53.5.8.3       T304 expiry (Reconfiguration with sync Failure)
The UE shall:
1>     if T304 of the MCG expires:
2>         release dedicated preambles provided in rach-ConfigDedicated if configured;
2>         revert back to the UE configuration used in the source PCell;
2>         if split SRB1 or SRB3 is configured:
3>             initiate the failure information procedure as specified in 5.7.5;
2>         else:
3>             initiate the connection re-establishment procedure as specified in 5.3.7.
NOTE 1:   In the context above, "the UE configuration" includes state variables and
parameters of each radio bearer.
1>     else if T304 of a secondary cell group expires:
2>         release dedicated preambles provided in rach-ConfigDedicated, if configured;
2>         initiate the SCG failure information procedure as specified in subclause 5.7.3 to
report SCG reconfiguration with sync failure, upon which the RRC reconfiguration
procedure ends;
1>     else if T304 expires when RRCReconfiguration is received via other RAT (HO to
NR failure):
2>         reset MAC;
2>         perform the actions defined for this failure case as defined in the specifications
applicable for the other RAT.
```

-continued 5.3.10.3   Detection of radio link failure
The UE shall:
1>   upon T310 expiry in PCell; or
1>   upon random access problem indication from MCG MAC while neither T300, T301, T304 nor T311 is running; or
1>   upon indication from MCG RLC that the maximum number of retransmissions has been reached:
2>   if CA duplication is configured and activated; and for the corresponding logical channel allowedServingCells only includes SCell(s):
3>   initiate the failure information procedure as specified in 5.7.x to report RLC failure
2>   else:
3>   consider radio link failure to be detected for the MCG i.e. RLF;
3>   if AS security has not been activated:
4>   perform the actions upon going to RRC_IDLE as specified in 5.3.11, with release cause 'other';
3>   else:
4>   if split SRB1 or SRB3 is configured:
5>   initiate the failure information procedure as specified in 5.7.5 to report MCG failure;
4>   else:
5>   initiate the connection re-establishment procedure as specified in 5.3.7.
5.7.5   Failure information
5.7.5.1   General
    FIG. 5.7.5.1-1: Failure information
The purpose of this procedure is to inform the network about a failure detected by the UE.
5.7.5.2   Initiation
A UE initiates the procedure when there is a need inform the network about a failure detected by the UE. In particular, the UE initiates the procedure when the following condition is met:
1>   upon detecting failure for an RLC bearer, in accordance with 5.3.10.3; or
1>   upon detecting radio link failure of the MCG, in accordance with 5.3.10; or
1>   upon re-configuration with sync failure of the MCG, in accordance with sub-clause 5.3.5.8.3; or
1>   upon mobility from NR failure, in accordance with sub-clause 5.4.3.5; or
1>   upon integrity check failure indication from lower layers concerning SRB1 or SRB2, except if the integrity check failure is detected on the RRCReestablishment message; or
1>   upon an RRC connection reconfiguration failure for RRCReconfiguration message received via SRB1, in accordance with sub-clause 5.3.5.8.2.
Upon initiating the procedure, the UE shall:
1>   if used to inform the network about a failure for the MCG:
2>   stop timer T310, if running;
2>   stop timer T304, if running;
2>   start timer T3xx;
2>   suspend all MCG RBs, except SRB0;
2>   reset MCG MAC;
2>   release the MCG SCell(s), if configured;
2>   release the current dedicated MCG ServingCell configuration;
2>   release delayBudgetReportingConfig, if configured, and stop timer T342, if running;
2>   release overheatingAssistanceConfig, if configured and stop timer T345, if running;
2>   perform cell selection in accordance with the cell selection process as specified in TS 38.304 [20, 5.2.6];
1>   initiate transmission of the FailureInformation message as specified in 5.7.5.3;
5.7.5.3 Actions related to transmission of FailureInformation message
The UE shall:
1>   if initiated to provide RLC failure information:
2>   set logicalChannelIdentity to the logical channel identity of the failing RLC bearer;
2>   set cellGroupIndication to the cell group of the failing RLC bearer;
2>   set failureType to the type of failure that was detected;
1>   if used to inform the network about a failure for the MCG:
2>   set measResultMCG-Failure to measurement results according to X.X;
2>   if split SRB1 is configured;
3>   submit the FailureInformation message to lower layers for transmission via SCG of SRB1;
2>   else if SRB3 is configured;
3>   submit the FailureInformation message to lower layers for transmission via SRB3;
1>   else if used to inform the network about a failure for an MCG RLC bearer
2>   submit the FailureInformation message to lower layers for transmission via SRB1;
1>   else if used to inform the network about a failure for an SCG RLC bearer: and if the UE is configured with EN-DC:
2>   if SRB3 is configured:
3>   submit the FailureInformation message to lower layers for transmission via SRB3;
2>   else:
3>   submit the FailureInformation message via the EUTRA MCG embedded in E-UTRA RRC message ULInformationTransferMRDC as specified in TS 36.331 [10].

In the above, the procedures at detection of Radio Link Failure, integrity check failure, inability to comply with RRCReconfiguration message, and handover failure are extended to instead of initiating a re-establishment, the UE transmits a Failure Information message via the SCG (either SCG part of split SRB1 or SRB3) so that the network can try to recover. As the FailureInformation message is proposed to be extended to include e.g. measurements, the procedures for preparing the FailureInformation message need to be extended to address this.

In addition, in the proposed procedures, the transmission of the FailureInformation upon MCG failure is assumed to be transmitted via the SCG part of the split SRB1 if it is configured, otherwise via SRB3, i.e. if both split SRB1 and SRB3 are configured, then the UE uses the split SRB1. However, an alternative solution would be that the UE would use SRB3 if configured, and only use the SCG part of split SRB1 in case there were no SRB3 configured. Similarly, there could be further consideration which path to use, e.g. based on failure type.

Thus, it is assumed that the UE, on encountering RLF on the MCG, will act in a similar way as for the same way as in legacy at the beginning of detecting an RLF, e.g. MCG radio bearers suspended, MCG SCells released.

A further improvement for faster recovery can be to have enhancements e.g., not to release the MCG SCells.

In the reconfiguration with sync procedure, we ensure any suspended MCG is also resumed, as shown below.

```
5.3.5.5 Cell Group configuration
5.3.5.5.1       General
The network configures the UE with Master Cell Group (MCG), and zero or one Secondary
Cell Group (SCG). For EN-DC, the MCG is configured as specified in TS 36.331 [10]. The
network provides the configuration parameters for a cell group in the CellGroupConfig IE.
The UE performs the following actions based on a received CellGroupConfig IE:
1>      if the CellGroupConfig contains the spCellConfig with reconfigurationWithSync:
2>      perform Reconfiguration with sync according to 5.3.5.5.2;
2>      resume all suspended radio bearers and resume SCG and MCG transmission for all
radio bearers, if suspended;
```

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

The invention claimed is:

1. A method performed by a user equipment (UE) comprising:
    detecting a failure relating to a connection between the UE and a Master Cell Group (MCG);
    providing, to a master node via a Secondary Cell Group (SCG), a Radio Resource Control (RRC) MCG Failure Information message relating to the detected failure;
    receiving, from the master node via the SCG, an RRC Reconfiguration message indicating to the UE to perform a connection reconfiguration with sync and update a security key; and
    responsive to the RRC Reconfiguration message, performing a random access procedure.

2. The method according to claim 1, wherein the RRC MCG Failure Information message includes a failure type.

3. The method according to claim 1, wherein the RRC MCG Failure Information message includes a measurement.

4. The method according to claim 1, wherein the detected failure comprises a radio link failure or a handover failure.

5. The method according to claim 1, wherein the RRC MCG Failure Information message is provided via signaling radio bearer 3 (SRB3).

6. The method according to claim 1, wherein the RRC MCG Failure Information message is provided via an SCG leg of split signaling radio bearer 1 (SRB 1).

7. The method according to claim 1, wherein the RRC Reconfiguration message is received via signaling radio bearer 3 (SRB3).

8. The method according to claim 1, wherein the RRC Reconfiguration message is received via an SCG leg of split signaling radio bearer 1 (SRB1).

9. The method according to claim 1, wherein the RRC Reconfiguration message indicates to perform a handover.

10. The method according to claim 1, wherein the RRC Reconfiguration message includes a handover configuration relating to a secondary node of the SCG or another node.

11. A user equipment (UE) comprising:
    a memory; and
    a processing circuitry that executes instructions from the memory to perform operations comprising:
        detecting a failure relating to a connection between the UE and a Master Cell Group (MCG);
        providing, to a master node via a Secondary Cell Group (SCG), a Radio Resource Control (RRC) MCG Failure Information message relating to the detected failure;
        receiving, from the master node via the SCG, an RRC Reconfiguration message indicating to the UE to perform a connection reconfiguration with sync and update a security key; and
        responsive to the RRC Reconfiguration message, performing a random access procedure.

12. The user equipment according to claim 11, wherein the RRC MCG Failure Information message includes a failure type.

13. The user equipment according to claim 11, wherein the RRC MCG Failure Information message includes a measurement.

14. The user equipment according to claim 11, wherein the detected failure comprises a radio link failure or a handover failure.

15. The user equipment according to claim 11, wherein the RRC MCG Failure Information message is provided via signaling radio bearer 3 (SRB3).

16. The user equipment according to claim 11, wherein the RRC MCG Failure Information message is provided via an SCG leg of split signaling radio bearer 1 (SRB1).

17. A non-transitory computer-readable storage medium having stored thereon instructions executable by processing circuitry to perform operations comprising:
- detecting a failure relating to a connection between a user equipment (UE) and a Master Cell Group (MCG);
- providing, to a master node via a Secondary Cell Group (SCG), a Radio Resource Control (RRC) MCG Failure Information message relating to the detected failure;
- receiving, from the master node via the SCG, an RRC Reconfiguration message indicating to the UE to perform a connection reconfiguration with sync and update a security key; and
- responsive to the RRC Reconfiguration message, performing a random access procedure.

18. The non-transitory computer-readable storage medium of claim 17, wherein the RRC MCG Failure Information message includes a failure type.

19. The non-transitory computer-readable storage medium of claim 17, wherein the RRC MCG Failure Information message includes a measurement.

20. The non-transitory computer-readable storage medium of claim 17, wherein the RRC MCG Failure Information message is provided via signaling radio bearer 3 (SRB3).

21. The non-transitory computer-readable storage medium of claim 17, wherein the RRC MCG Failure Information message is provided via an SCG leg of split signaling radio bearer 1 (SRB1).

\* \* \* \* \*